United States Patent
Shi et al.

(10) Patent No.: US 9,947,336 B2
(45) Date of Patent: Apr. 17, 2018

(54) ACOUSTIC ECHO MITIGATION APPARATUS AND METHOD, AUDIO PROCESSING APPARATUS AND VOICE COMMUNICATION TERMINAL

(71) Applicant: DOLBY LABORATORIES LICENSING CORPORATION, San Francisco, CA (US)

(72) Inventors: Dong Shi, Shanghai (CN); Xuejing Sun, Beijing (CN); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 225 days.

(21) Appl. No.: 14/775,038

(22) PCT Filed: Mar. 10, 2014

(86) PCT No.: PCT/US2014/022591
§ 371 (c)(1),
(2) Date: Sep. 11, 2015

(87) PCT Pub. No.: WO2014/150211
PCT Pub. Date: Sep. 25, 2014

(65) Prior Publication Data
US 2016/0019909 A1 Jan. 21, 2016

Related U.S. Application Data
(60) Provisional application No. 61/807,539, filed on Apr. 2, 2013.

(30) Foreign Application Priority Data
Mar. 15, 2013 (CN) .......................... 2013 1 0084973

(51) Int. Cl.
*G10L 21/00* (2013.01)
*G10L 21/0232* (2013.01)
(Continued)

(52) U.S. Cl.
CPC ...... *G10L 21/0232* (2013.01); *G10L 21/0208* (2013.01); *G10L 25/21* (2013.01);
(Continued)

(58) Field of Classification Search
None
See application file for complete search history.

(56) References Cited

U.S. PATENT DOCUMENTS

| | | | |
|---|---|---|---|
| 6,035,034 | A | 3/2000 | Trump |
| 6,522,747 | B1 | 2/2003 | Reilly |

(Continued)

FOREIGN PATENT DOCUMENTS

| | | |
|---|---|---|
| EP | 1978649 | 10/2008 |
| EP | 2330752 | 6/2011 |
| WO | 2011/010960 | 1/2011 |

OTHER PUBLICATIONS

Myllyla, Ville "Residual Echo Filter for Enhanced Acoustic Echo Control" Oct. 17, 2005, Signal Processing, vol. 86, Issue 6, pp. 1193-1205.
(Continued)

*Primary Examiner* — Marcus T Riley

(57) ABSTRACT

The present application provides an acoustic echo mitigation apparatus and method, an audio processing apparatus and a voice communication terminal. According to an embodiment, an acoustic echo mitigation apparatus is provided, including: an acoustic echo canceller for cancelling estimated acoustic echo from a microphone signal and outputting an error signal; a residual echo estimator for estimating residual echo power; and an acoustic echo suppressor for
(Continued)

further suppressing residual echo and noise in the error signal based on the residual echo power and noise power. Here, the residual echo estimator is configured to be continuously adaptive to power change in the error signal. According to the embodiments of the present application, the acoustic echo mitigation apparatus and method can, at least, be well adaptive to the change of power of the error signal after the AEC processing, such as that caused by change of double-talk status, echo path properties, noise level and etc.

22 Claims, 13 Drawing Sheets

(51) Int. Cl.
*H04M 9/08* (2006.01)
*G10L 21/0208* (2013.01)
*G10L 25/21* (2013.01)
*G10L 25/60* (2013.01)
*G10L 21/0216* (2013.01)

(52) U.S. Cl.
CPC ............ *G10L 25/60* (2013.01); *H04M 9/082* (2013.01); *G10L 2021/02082* (2013.01); *G10L 2021/02163* (2013.01)

(56) References Cited

U.S. PATENT DOCUMENTS

| | | | |
|---|---|---|---|
| 6,687,723 | B1 | 2/2004 | Ding |
| 7,117,145 | B1* | 10/2006 | Venkatesh ........... G10L 21/0208 704/200 |
| 7,171,003 | B1* | 1/2007 | Venkatesh ................ H03G 3/32 381/66 |
| 7,440,891 | B1 | 10/2008 | Shozakai |
| 7,813,499 | B2 | 10/2010 | Chhetri |
| 7,991,146 | B2 | 8/2011 | Beaucoup |
| 8,325,910 | B2* | 12/2012 | Kobayashi ............ H04M 9/082 379/406.01 |
| 2002/0031195 | A1 | 3/2002 | Honary |
| 2003/0050786 | A1* | 3/2003 | Jax ......... G10L 21/038 704/500 |
| 2004/0264686 | A1 | 12/2004 | Enzner |
| 2005/0063536 | A1 | 3/2005 | Myllyla |
| 2006/0222172 | A1 | 10/2006 | Chhetri |
| 2009/0214048 | A1 | 8/2009 | Stokes, III |
| 2009/0279686 | A1 | 11/2009 | Tan |
| 2009/0310796 | A1 | 12/2009 | Seydoux |
| 2009/0316924 | A1* | 12/2009 | Prakash ................. H04M 9/082 381/66 |
| 2010/0074434 | A1* | 3/2010 | Kobayashi ............ H04M 9/082 379/406.08 |
| 2011/0033059 | A1 | 2/2011 | Bhaskar |
| 2011/0170683 | A1 | 7/2011 | Lu |
| 2012/0237047 | A1* | 9/2012 | Neal ...................... H04B 3/234 381/66 |
| 2013/0230184 | A1* | 9/2013 | Kuech ................... H04M 9/085 381/66 |

OTHER PUBLICATIONS

Van Waterschoot, T. et al "Double-Talk Robust Prediction Error Identification Algorithms for Acoustic Echo Cancellation" IEEE Transactions on Signal Processing, vol. 55, Issue 3, pp. 846-858 Mar. 1, 2007.

Faller, C. et al "Suppressing Acoustic Echo in a Spectral Envelope Space" IEEE Transactions on Speech and Audio Processing, pp. 1048-1062, Sep. 2005, vol. 13, Issue 5.

Martin, Rainer "Noise Power Spectral Density Estimation Based on Optimal Smoothing and Minimum Statistics" IEEE Transactions on Speech and Audio Processing, vol. 9, Issue 5, pp. 504-512, Jul. 2001.

* cited by examiner

ACOUSTIC ECHO MITIGATION APPARATUS AND METHOD, AUDIO PROCESSING APPARATUS AND VOICE COMMUNICATION TERMINAL

CROSS REFERENCE TO RELATED APPLICATIONS

This application claims priority to Chinese Patent Application No. 20130084973.3, filed on 15 Mar. 2013 and U.S. Provisional Patent Application No. 61/807,539, filed on 2 Apr. 2013, each of which is hereby incorporated by reference in its entirety.

TECHNICAL FIELD

The present application relates generally to audio signal processing. More specifically, embodiments of the present application relate to an acoustic echo mitigation apparatus and method, and an audio processing apparatus and voice communication terminal comprising the same acoustic echo mitigation apparatus.

BACKGROUND

In voice communication, acoustic echo mitigation is a great challenge. Acoustic echo is caused by the fact that the microphone may re-capture the audio signal played out by the loudspeaker (loudspeaker signal or reference signal), and thus the talker on the other side (far-end) will hear his own voice together with the input of the near end.

Conventionally there are two fundamental techniques for mitigating acoustic echo. One is acoustic echo cancellation (AEC) and the other is acoustic echo suppression (AES). Nowadays AEC is generally used to cancel most acoustic echo from the microphone signal and AES is generally used to further suppress residual echo in the error signal obtained after the AEC processing. AES might be used alone when low complexity or robustness to minor echo path changes is desired (Christof Faller, Jingdong Chen: *Suppressing Acoustic Echo in a Spectral Envelope Space*. IEEE Transactions on Speech and Audio Processing 13(5-2): 1048-1062 (2005), the entirety of which is incorporated herein by reference).

The proper operation of AES depends on proper gains obtained based on residual echo power estimated from the error signal output from AEC. However, it is a challenging task to estimate the residual echo power with both robustness and swiftness-due to power change in the error signal, which may be caused by various factors, such as noise, double talk (or near end talk), change of properties of the echo path (LEM, Loudspeaker-Enclosure-Microphone) such as switching between headset and loudspeaker, and etc.

One solution is to employ a simple hard-decision voice activity detector for a double talk flag, then the AES may be adjusted depending on the flag so that near end talk will not be regarded as residual echo and suppressed erroneously. An example may be found in Makoto Shozakai et al., U.S. Pat. No. 7,440,891, patented on Oct. 21, 2008 and originally assigned to Asahi Kasei Kabushiki Kaisha, titled "Speech Processing Method and Apparatus for Improving Speech Quality and Speech Recognition Performance", the entirety of which is incorporated herein by reference. However, in such a solution, the hard-decision flag regarding double talk would depend on experiential selection of a threshold, which usually cannot meet requirements in all scenarios. Furthermore, such a solution tends to confuse double talk with other changes, such as echo path change, or noise level change which also result in power change in the error signal.

SUMMARY

The embodiments of the present application provide solutions at least to properly deal with power change in the error signal. Rather than making hard decisions regarding such as double talk, echo path change or noise, the present application proposes to continuously track or follow the power change in the error signal while selecting from history more reliable estimations based on a well-designed mechanism. In this way, echo path change (including noise change) is well followed and distinguished from double talk. Additionally, the proposed method proposes an approach to controlling the adaptive filter in AEC using a soft decision. This excludes the necessity of defining hard thresholds for claiming double talk/echo path change.

According to an embodiment of the application, an acoustic echo mitigation apparatus is provided, including: an acoustic echo canceller for cancelling estimated acoustic echo from a microphone signal and outputting an error signal; a residual echo estimator for estimating residual echo power; and an acoustic echo suppressor for further suppressing residual echo and noise in the error signal based on the residual echo power and noise power. Here, the residual echo estimator is configured to be continuously adaptive to power change in the error signal.

According to another embodiment, an acoustic echo mitigation method is also provided, including: cancelling, with an acoustic echo canceller, estimated acoustic echo from a microphone signal, resulting in an error signal; estimating residual echo power based on the error signal in a manner continuously adapted to power change in the error signal; and further suppressing, with an acoustic echo suppressor, residual echo and noise in the error signal based on the residual echo power and noise power.

The present application also provides an audio processing apparatus comprising the acoustic echo mitigation apparatus as described above and a voice communication terminal comprising the acoustic echo mitigation apparatus as described above.

Yet another embodiment involves a computer-readable medium having computer program instructions recorded thereon, when being executed by a processor, the instructions enabling the processor to execute an acoustic echo mitigation method as described above.

According to the embodiments of the present application, the acoustic echo mitigation apparatus and method can, at least, be well adaptive to the change of power of the error signal after the AEC processing, such as that caused by change of double-talk status, echo path properties, noise level and etc.

BRIEF DESCRIPTION OF DRAWINGS

The present application is illustrated by way of example, and not by way of limitation, in the figures of the accompanying drawings and in which like reference numerals refer to similar elements and in which.

DETAILED DESCRIPTION

Figure 1:
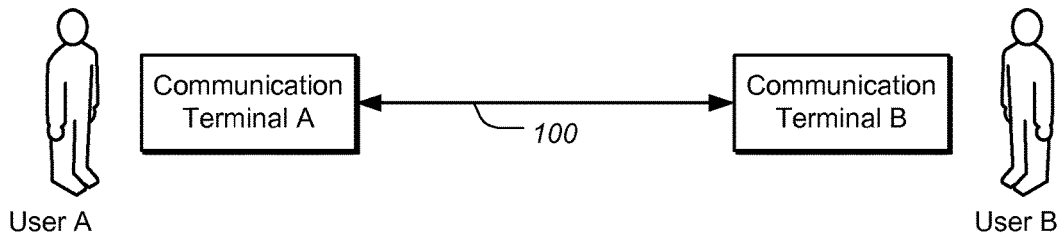
FIG. 1 is a diagram schematically illustrating an exemplary voice communication system where embodiments of the application can be applied.

The embodiments of the present application are below described by referring to the drawings. It is to be noted that, for purpose of clarity, representations and descriptions about those components and processes known by those skilled in the art but not necessary to understand the present application are omitted in the drawings and the description. In addition, the symbols in the formulae proposed in this application are consistent throughout the specification, unless otherwise recorded. Therefore, for conciseness, generally the meaning of the symbols will be explained only once at the first appearance and not be repeated thereafter.

As will be appreciated by one skilled in the art, aspects of the present application may be embodied as a system, a device (e.g., a cellular telephone, a portable media player, a personal computer, a server, a television set-top box, or a digital video recorder, or any other media player), a method or a computer program product. Accordingly, aspects of the present application may take the form of a hardware embodiment, a software embodiment (including firmware, resident software, microcodes, etc.) or an embodiment combining both software and hardware aspects that may all generally be referred to herein as a "circuit," "module" or "system." Furthermore, aspects of the present application may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic or optical signal, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer as a stand-alone software package, or partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present application are described below with reference to flowchart illustrations and/or block diagrams of methods, apparatus (systems) and computer program products according to embodiments of the application. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

System Overview and Overall Solutions

FIG. 1 is a diagram schematically illustrating an example voice communication system where embodiments of the application can be applied.

As illustrated in FIG. 1, user A operates a communication terminal A, and user B operates a communication terminal B. In a voice communication session, user A and user B talk to each other through their communication terminals A and B. The communication terminals A and B are coupled through a data link 100. The data link 100 may be implemented as a point-to-point connection or a communication network. At either side of user A and user B, audio blocks are transmitted to the other user's communication terminal through the data link 100. The other user's communication terminal receives the transmitted audio blocks and stores them to entries corresponding to the same time as the audio blocks in its jitter buffer, to eliminate transmission jitters. Audio blocks in the jitter buffer are fed through decoding and processing to reproduce them at the output transducer or transducers of the communication terminal.

The voice reproduced by the loudspeaker of one terminal, such as terminal B, may be captured by the microphone of the same terminal (microphone signal) and thus transmitted to the other terminal, such as terminal A. Thus user A will hear his/her own voice transmitted to terminal B (reference signal) and then returned to terminal A. This is the phenomenon of acoustic echo. Therefore, both terminals need a module for mitigating the acoustic echo.

Figure 2:
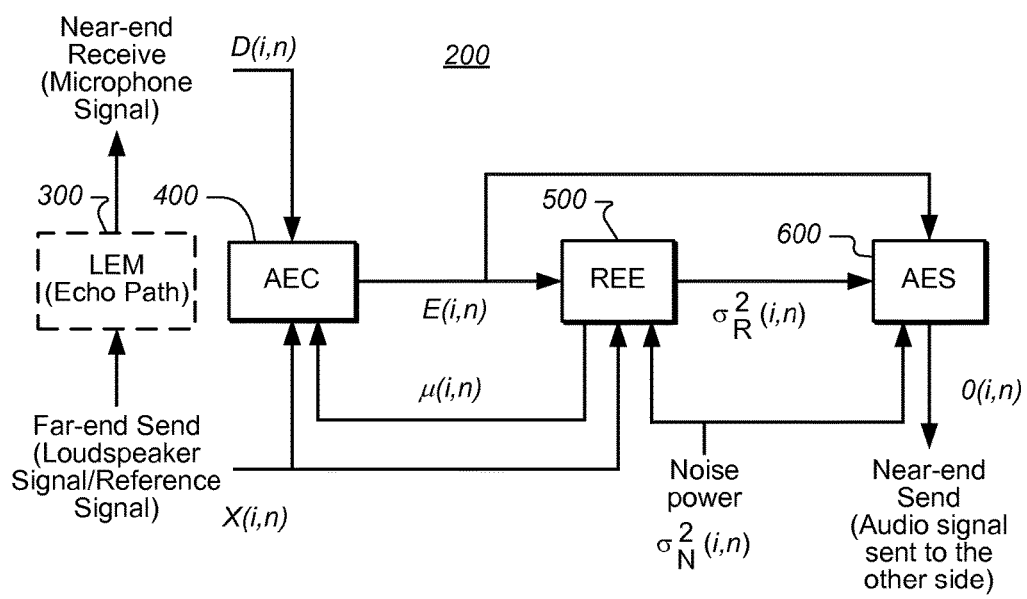
FIG. 2 is a diagram illustrating an acoustic echo mitigation apparatus according to an embodiment of the application.

As shown in FIG. 2, according to an embodiment, an acoustic echo mitigation apparatus 200 comprises an acoustic echo canceller (AEC) 400 for cancelling estimated acoustic echo from a microphone signal and outputting an error signal; a residual echo estimator (REE) 500 for estimating residual echo power; and an acoustic echo suppressor (AES) 600 for further suppressing residual echo and noise in the error signal based on the residual echo power and noise power. Wherein the REE 500 is configured to be continuously adaptive to power change in the error signal.

In this embodiment, as in conventional solutions, all the input audio signals are first transformed into frequency domain and then go through these blocks. We use i and n to represent the frequency bin and frame index while X(i,n), D(i,n) and E(i,n) are the reference signal (or far-end send/loudspeaker signal), microphone signal and filter output error signal, respectively. If only AEC 400 is used in the acoustic echo mitigation apparatus 200, the filter output error signal would ideally be the near-end send signal. In the proposed solutions, the error signal is further processed by REE 500 and AES 600.

AEC is assumed to remove the echo from the microphone signal (i,n), which is the loudspeaker signal X(i,n) transmitted by LEM (Loudspeaker-Enclosure-Microphone, that is, the echo path) 300 and distorted by a transfer function H(i,n) of the LEM 300.

The basic operations that are carried out in the AEC block form an adaptive filter, which often employs the normalized least mean-squares (NLMS) optimization criterion that is given by:

Calculating filter output, that is the estimated acoustic echo:

$$\hat{D}(i,n) = \hat{H}^*(i,n-1)X(i,n) \quad (1)$$

Computing the error signal:

$$E(i,n) = D(i,n) - \hat{D}(i,n) \quad (2)$$

Updating filter coefficient set, or the transfer function:

$$\hat{H}(i,n) = \hat{H}(i,n-1) + \frac{\mu(i,n)}{P_x(i,n) + \epsilon} X(i,n) E^*(i,n) \quad (3)$$

Where X(i,n) is the reference signal history, X(i,n)=[X(i, n), X(i, n−1), ... X(i, n−M−1)]$^T$, where M is a predefined constant specifying the filter length. $P_x$(i,n) is the power of the input signal (reference signal) X(i,n), $P_x$(i,n)= $\Sigma_{p=0}^{M-1}|\tilde{X}^2(i,n-p)|$, and $\epsilon$ is a small regularization factor for avoiding zero or extremely small denominator, should be as small as possible depending on data precision. $\hat{H}$(i,n) is of the same dimension as X(i,n) and is an estimate of the real transfer function H(i,n). μ(i,n) is the step-size for updating the coefficient set.

The step-size may be either fixed or dynamic. In one embodiment of the present application, the residual echo estimator (REE) is configured to update the step size μ(i,n) in the acoustic echo canceller based on the residual echo power $\sigma_R^2$(i,n) estimated by the REE (which will be discussed in details later), and the power |E(i,n)|$^2$ of the error signal, that is $$\mu(i,n) = \frac{\sigma_R^2(i,n)}{|E(i,n)|^2} \quad (4)$$

In another embodiment, the power |E(i,n)|$^2$ of the error signal may be replace by the expectation $\sigma_E^2$(i,n) of the error signal power |E(i,n)|$^2$:

$$\mu(i,n) = \frac{\sigma_R^2(i,n)}{\sigma_E^2(i,n)} \quad (5)$$

The expectation of the error signal power may be calculated in various ways, and one of them may be:

$$\sigma_E^2(i,n) = \frac{\sum_{n=1}^{P} |E(i,n)|^2}{U} \quad (6)$$

Where U is the number of frames used to calculate the expectation (mean). Of course the expectation may also be calculated as a long-term mean of the error signal power. Alternatively, the expectation may be calculated as a time-smoothed version of the error signal power. Further, the expectation can also be computed using a first order IIR filter.

Formula (4) reflects the instantaneous value of the step size, and formula (5) reflects theoretically optimal step-size. When using formula (4), if there is an obvious power change such as during the presence of double talk, the step-size will decrease quickly while this will not happen in formula (5) due to delay. Therefore, using formula (4) provides more robustness against power changes such as during double talk in practice.

The step-size used to update the coefficient set of the filter of the AEC is generally used in NLMS-based AEC. There are various NLMS-based algorithms, including proportionate normalized least mean square (PNLMS), improved PNLMS (IPNLMS) and affine projection algorithm (APA), etc. There are also other algorithms using step-size, or other algorithms using other parameter adaptively changed with the result of AEC.

For avoiding the divergence of the adaptive filter in AEC, the step-size may be further limited:

$$\mu(i,n) = \min(\mu(i,n), \mu_{max}) \quad (7)$$

where $\mu_{max}$ is an upperbound of step-size. Usually, the ideal step-size for fastest convergence is 1 while 2 is the upper bound for avoiding divergence. In the present application the step-size may be set substantially smaller than 1. So the upper bound may be set to be 0.5 to 1 depending on specific application scenarios, such as 0.65.

The residual echo power $\sigma_R^2(i,n)$ is further used in AES 600, together with the noise power estimate $\sigma_N^2(i,n)$, to further suppress the noise and residual echo in the error signal from AEC.

Generally, the AES computes a gain G (i,n) applied to the AEC error signal as follows:

$$G(i,n) = \min\left(1, \frac{\max(0, |E(i,n)|^2 - \sigma_R^2(i,n) - \sigma_N^2(i,n))}{|E(i,n)|^2}\right) \quad (8)$$

$$O(i,n) = G(i,n) * E(i,n) \quad (9)$$

Where O(i,n) is the output signal of the AES, that is, the processed near-end send signal to be transmitted to the other side such as in the voice communication system in FIG. 1. The gain function (8) can also take other forms.

The noise power estimate $\sigma_N^2(i,n)$ can be obtained through many conventional means. For example, the noise power may be estimated by detecting speech free moments and averaging the microphone signal power. In addition, one commonly used method is based on using the minimum statistics of input power. Reference may be made to the paper: R. Martin: *Noise Power Spectral Density Estimation Based On Optimal Smoothing And Minimum Statistics*, IEEE Trans. Speech Audio Process. 9(5), 504-512 (2001), the entirety of which is incorporated herein by reference.

Residual Echo Estimation: First Embodiment

FIGS. 3-7 illustrate some implementations of the residual echo estimator (REE).

Basically, the embodiments of the present application are based on tracking the change of the output (error signal) from the AEC, and implicitly distinguishing different scenarios (such as double talk and single talk) which result in the change of the error signal through monitoring the minimum statistics of the error signal, thus providing an efficient and robust control of filter adaptation and residual echo estimation.

In one embodiment, as shown in FIGS. 3-7, the residual echo estimator 500 (500A-500E) may include a first adaptive filter 510 for obtaining a preliminary estimate of the residual echo power; a first buffer 530 for holding the coefficient sets of the first adaptive filter 510 for a first number of past frames; a second adaptive filter 520 for obtaining a final estimate of the residual echo power; and a coefficient adaptor 540 for determining the coefficient set of the second adaptive filter 520 for the present frame based on the minimum statistics of the norms of the coefficient sets held in the first buffer 530. In the embodiment, the coefficient set of the first adaptive filter 510 is adaptively updated to continuously follow the power change in the error signal.

Thus, the second adaptive filter 520 is updated or adjusted based on monitoring the norms of the past coefficient sets of the first adaptive filter 510. By tracking the minimum statistics of the coefficient sets of the first adaptive filter 510, the impact of the power change (such as due to double talk) of the error signal on the residual echo power estimation can be significantly reduced. Here, the coefficient sets of the first adaptive filter 510 for past frames constitute the background for determining the coefficient set of the second adaptive filter 520 for the present frame, thus the first adaptive filter 510 may also be named as "background filter" and the second adaptive filter 520 as "foreground filter".

Note that generally speaking, the first adaptive filter 510 and the second adaptive filter 520 may be constructed based on a principle identical or similar to that of AEC, except that the input, output and parameter settings are different. However, in a specific application, the first adaptive filter 510 and the second adaptive filter 520 may adopt different techniques from AEC.

Specifically, let $L_{FG}$ (i,n) and $L_{BG}$ (i,n) denote two M' by 1 vectors which hold the coefficients (or coefficient set) of the second adaptive filter (foreground filter) and the coefficients (or coefficient set) of the first adaptive filter (background filter), respectively. The first adaptive filter 510 is configured to update its coefficient set frame by frame in a process of estimating a preliminary residual echo power, while the real (or final estimate of the) residual echo power is calculated by the second adaptive filter 520 using the coefficient set determined by the coefficient adaptor 540. Note that here the filter length M' may be the same as or different from the filter length M of AEC, whether or not AEC and REE adopt the same or different techniques. Specifically, M' may be either smaller or greater than M.

In a variant, the second adaptive filter 520 is configured to obtain the final estimate of the residual echo power based on history of reference signal power, and the coefficient adaptor 540 is configured to choose the coefficient set the norm of which is of the minimum statistics among the coefficient sets held in the first buffer.

For example, define the norm of coefficient set of the first adaptive filter as $N_{BG}(i,n) = |L_{BG}(i,n)|$, where |X| denotes the amplitude (norm) of the vector X. Similarly, let $N_{FG}(i,n) = |L_{FG}(i,n)|$ denote the norm of the coefficient set of the second adaptive filter. Furthermore, let $F_{BG}(i,n)$ be the first buffer 530 for holding the coefficient sets of the first adaptive filter for the past Q (the first number) frames, that is $F_{BG}(i,n) = [L_{BG}(i,n), L_{BG}(i, n-1), \ldots L_{BG}(i, n-Q-1)]$. Also define the vector $N_{BG}(i,n) = [N_{BG}(i,n), N_{BG}(i, n-1) \ldots, N_{BG}(i, n-Q-1)]^T$ as a set for holding the norms of the coefficient sets of the first adaptive filter for the past Q frames. Let $N_{bg}^{min}(i,n)$ and $N_{BG}^{max}(i,n)$ denote the minimum and maximum norm in $N_{BG}(i,n)$, respectively. Then:

$$\sigma_R^2(i,n) = L_{FG}^T(i,n) X^2(i,n) \quad (10)$$

where $X^2(i,n) = [|X(i,n)|^2, |X(i, n-1)|^2, \ldots, |X(i, n-M'-1)|^2]^T$ $$L_{FG}(i,n) = L_{BG}^{min}(i,n) \quad (11)$$

Where $L_{BG}^{min}(i,n)$ is the coefficient set in $F_{BG}(i,n)$ corresponding to the minimum norm $N_{BG}^{min}(i,n)$ in $N_{BG}(i,n)$.

Here we used the minimum norm as the minimum statistics. However, the minimum statistics of the norms may also be other statistics, such as minimum derivative of first order or higher order of the norms along the time line. As for the derivative of first order, it can be regarded as the changing rate of the norm of the coefficient set (and thus the coefficient set itself) with the time, in other words, with the frame index n.

It can be seen that in the proposed embodiments, the second adaptive filter will trace the first adaptive filter coefficient set which has the minimum statistics (minimum norm). Usually, the minimum statistics tends to correspond to the frame where there is likely little double talk or echo path change. Therefore, by tracing the minimum statistics, the embodiments of the application may implicitly and continuously track the coefficient set corresponding to the scenarios without or with little double talk or noise, and thus obtain a proper result of residual echo estimation without affected by double talk or noise. That is, even if there is an increase of double talk or noise, the minimum statistics will still be maintained at the low level of the scenario only with acoustic echo. On the other hand, if the echo path changes (such as from headset to loudspeaker), the minimum statistics will increase also and thus it will not be misunderstood as the increase of double talk or noise.

In brief, by tracing the first adaptive filter coefficients which are of minimum norm, the chance of updating the second filter with the divergent coefficient sets of the first adaptive filter is significantly reduced. Therefore, the estimated residual echo power $\sigma_R^2(i,n)$ stays close to the true value even during double talk. Therefore, the AEC can obtain more accurate step-size to do the acoustic echo cancellation processing and the AES can obtain more accurate gain to do the acoustic echo suppression processing. This finally will make the output signal (near-end send) contain only near-end speech without distortion as much as possible and with noise and acoustic echo effectively removed as much as possible.

The first adaptive filter $L_{BG}(i,n)$ may be any filter capable of estimating residual echo power by tracking the change of the error signal. In a variant, it may be an adaptive filter which tries to approximate the smoothed version of error signal E (i,n) from the AEC. Specifically, the first adaptive filter 510 may be configured to obtain the preliminary estimate of the residual echo power and update the coefficient set based on history of smoothed versions of reference signal power, a smoothed version of the error signal, and the noise power. Let $\tilde{E}(i,n)$ and $\tilde{X}^2(i,n)$ be the smoothed versions of the error signal from the AEC and reference signal power, respectively, where $$\tilde{E}(i,n)=\alpha\tilde{E}(i,n-1)+(1-\alpha)|E(i,n)|^2 \quad (12)$$

$$\tilde{X}^2(i,n)=\alpha\tilde{X}^2(i,n-1)+(1-\alpha)|X(i,n)|^2 \quad (13)$$

Where α is a smoothing factor in a range of [0, 1], preferably the range may be 0.7~0.95, such as 0.9 but not limited thereto. The basic operation of the first adaptive filter may be as follows:

Calculating preliminary estimate of the residual echo power:

$$\tilde{\sigma}_R^2(i,n)=L_{BG}^T(i,n-1)\tilde{X}^2(i,n) \quad (14)$$

Computing the error signal output from the first adaptive filter:

$$\hat{E}(i,n)=\tilde{E}(i,n)-\tilde{\sigma}_R^2(i,n)-\sigma_N^2(i,n) \quad (15)$$

Updating filter coefficient set:

$$L_{BG}(i, n) = L_{BG}(i, n-1) + \frac{\mu_0}{P_{x^2}(i, n) + \epsilon}\tilde{X}^2(i, n)\hat{E}(i, n) \quad (16)$$

Where $\tilde{X}^2$ (i,n) is the filter history containing the smoothed versions of reference signal power, i.e., $\tilde{X}^2(i,n)=[\tilde{X}^2(i,n), \tilde{X}^2(i, n-1), \ldots \tilde{X}^2(i, n-M'-1)]^T$. $\mu_0$ is a constant step size in the range of [0.1, 0.3] but not limited thereto. $P_{x^2}(i,n)$ is calculated as:

$$P_{x^2}(i,n)=\Sigma_{p=0}^{M'-1}|\tilde{X}^2(i,n-p)|^2 \quad (17)$$

In the embodiment and variants discussed above, the coefficient set of the first adaptive filter corresponding to the minimum statistics of the norms of the coefficient sets of the first adaptive filter is determined as the coefficient set of the second adaptive filter. In further variants, there are some exceptions.

In one scenario, if the coefficient set of the first adaptive filter fluctuates too significantly, then it is better not to change the second adaptive filter to avoid divergence caused by any unstable state such as unstable echo path, or frequent switch between single talk and double talk, or unstable double talk state. This in many cases corresponds to double talk where the first adaptive filter coefficients experience substantial fluctuations. Therefore, for the past Q frames, the first adaptive filter coefficients are much less stationary than the single talk case (where there is no local speech activity). Therefore, the coefficient adaptor 540 may be configured to use the coefficient set of the second adaptive filter for the last frame if the fluctuation of the norms of the coefficient sets held in the first buffer 530 reaches a predetermined degree. In one implementation, the fluctuation may be reflected by a ratio of maximum statistics over minimum statistics among the norms of the coefficient sets of the first adaptive filter. That is, the coefficient adaptor 540 may be configured to use the coefficient set for the last frame if the ratio of the maximum statistics over the minimum statistics of the norms of the coefficient sets held in the first buffer reaches a first threshold. As discussed before, the maximum statistics and the minimum statistics may be maximum and minimum norms, or maximum and minimum derivative (of first order or higher order) of the norms with respect to time. Note that if using derivative, it should be the absolute value of the derivative. Thus the term "derivative" should be so construed throughout the present application. Take minimum and maximum norms as example, the coefficient set may be set as:

$$L_{FG}(i, n) = \begin{cases} L_{BG}^{min}(i, n), \text{ if } \frac{N_{BG}^{max}(i, n)}{N_{BG}^{min}(i, n)} < TH1 \text{ or} \\ L_{FG}(i, n-1) \text{ otherwise} \end{cases} \quad (18)$$

Where the threshold TH1 is a predefined constant ranging from 1.1 to 1.5, such as 1.2 but not limited thereto.

In another implementation, if the present coefficient set of the second adaptive filter already properly reflects the scenario without or with little double talk or noise, then it would be better to continue to use the present coefficient set. Thus, if the minimum statistics is the minimum norm among the norms of the coefficient sets held in the first buffer, then the coefficient adaptor 540 may be configured to use the coefficient set for the last frame if the minimum norm is greater than the norm of the coefficient set of the second adaptive filter for the last frame, that is:

$$L_{FG}(i, n) = \begin{cases} L_{BG}^{min}(i, n), \text{ if } N_{BG}^{min}(i, n) < N_{FG}(i, n-1) \text{ or} \\ L_{FG}(i, n-1) \text{ otherwise} \end{cases} \quad (19)$$

In a variant, formula (18) and formula (19) may be combined together:

$$L_{FG}(i,n) = \begin{cases} L_{BG}^{min}(i,n), & \text{if } N_{BG}^{min}(i,n) < N_{FG}(i,n-1) \text{ or} \\ L_{BG}^{min}(i,n), & \text{if } \dfrac{N_{BG}^{max}(i,n)}{N_{BG}^{min}(i,n)} < TH1 \text{ or} \\ L_{FG}(i,n-1) & \text{otherwise} \end{cases} \quad (20)$$

It should also be pointed out that in order to improve the minimum search efficiency, the past Q frames can be further divided into smaller blocks whereas the minimum ones in each block is searched and stored. In this way, every time the frames are updated, the number of searching operations can be reduced by just comparing the minimum values of each block instead of all the Q values.

Figure 4:
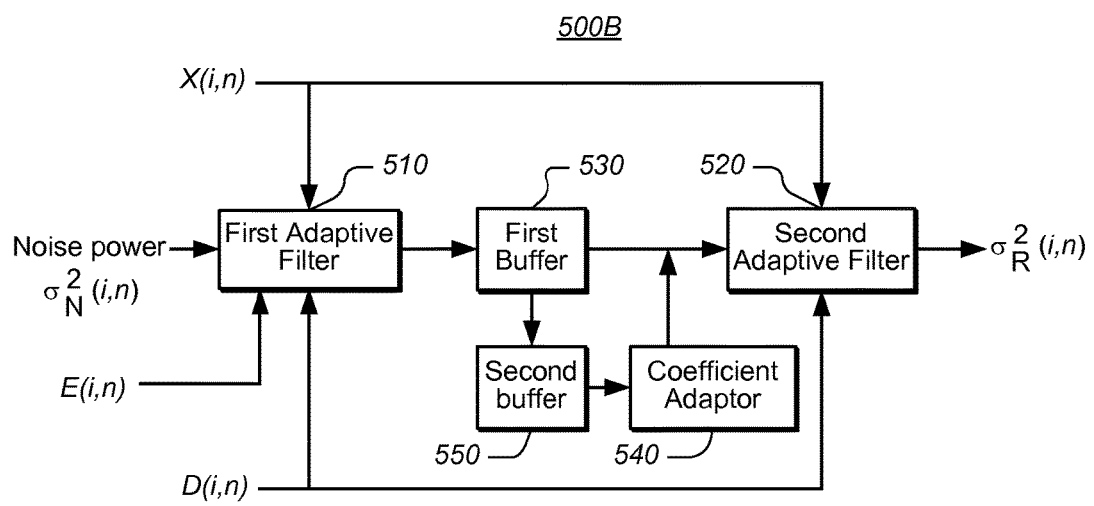

Therefore, in a variant as shown in FIG. 4, a second buffer 550 is provided for holding a local minimum statistics of the norms of coefficient sets for every group of second number (such as A) of frames, and wherein the coefficient adaptor 540 may be configured to choose the coefficient set whose norm is of the minimum statistics among the local minimum statistics for a third number (such as B) of past groups of frames. That is, Q=A×B.

From above description, it could be seen that for finding the minimum statistics, a first number (Q) of past frames are used. In fact the present frame n is also included in the Q frames. For conciseness, just the expression "a first number of past frames" is used throughout the present application, and such expression shall be construed as either including the present frame or not including the present frame. In other words, both solutions are covered by the claims These past frames may be regarded as selected with a sliding window having a length of Q frames and ending with the present frame (or the last frame). Incidentally, the moving step-size of the sliding window may be one or more frames. When it's more than one frame, the minimum statistics for the present frame will not change between two movements of the sliding window, although "the present frame" is constantly changing. For example, in the variant using the second buffer, the step-size may be the length of each group of frames, that is A frames.

In a further variant, the size of the sliding window, that is the first number, may be adjusted depending on scenarios. For example, first number may be decreased where suppressing echo is more important than preserving double talk speech quality, and increased otherwise. That is, for instance, if single talk echo estimation is of more importance (i.e., suppressing echo is more important than preserving double talk speech quality), it might be beneficial to decrease the window size to allow quick response to changes. On the other hand, if speech quality is emphasized more, having a longer window size can improve double talk performance.

If higher level context information is available (conversation context, meeting types, and so on), the window size can be changed according to different specific purposes. For instance, if the embodiment of the present application is used in telecommunication device fixed in a quiet conference room with stable echo path, the window size maybe increased for better double talk performance, whereas if it is used in a mobile device where there is strong echo and non-stationary noise, the window size can be decreased for changing echo paths. The adjustment of window size may also be dependent on operating system conditions.

The high level context information may be considered during the manufacture of the apparatus incorporating the embodiments of the present application, or be provided from outside, such as via a mode-switching button provide on the apparatus incorporating the embodiments of the present application, or other devices detecting relevant events such as switch of headset and loudspeaker.

However, when there is no high level information, the window size can also be variable depending on the long term history. Therefore, in a further variant, a changing rate estimator 560 is provided for calculating a changing rate of the norm of the coefficient set of the first adaptive filter, and wherein the first number (the size Q of the sliding window) may decrease where the changing rate is less than a fourth threshold for a seventh number of consecutive observations; and/or increase where the changing rate is not less than the fourth threshold for an eighth number of consecutive observations. That is, the slower the coefficient set changes, the smaller the window size is, since low changing rate often means the error single from the AEC is relatively stable and probably there is no double talk or noise, etc, thus it is unnecessary to spend too much resource on too many past frames. On the other hand, quicker changing rate of the coefficient rate often means fluctuation of the error signal from the AEC due to power change of the microphone signal, probably including double talk, noise and etc, and thus a larger window size is necessary to ensure a real minimum statistics reflecting the real acoustic echo level may be found. Generally, we need a quicker response to the appearance of double talk or noise, thus we may set a smaller eighth number than the seventh number. Note that here the term "consecutive observations" means consecutive "present frames". That is, for each present frame, we will calculate the changing rate of the norm of the coefficient set of the first adaptive filter.

Residual Echo Estimation: Second Embodiment

Figure 3:
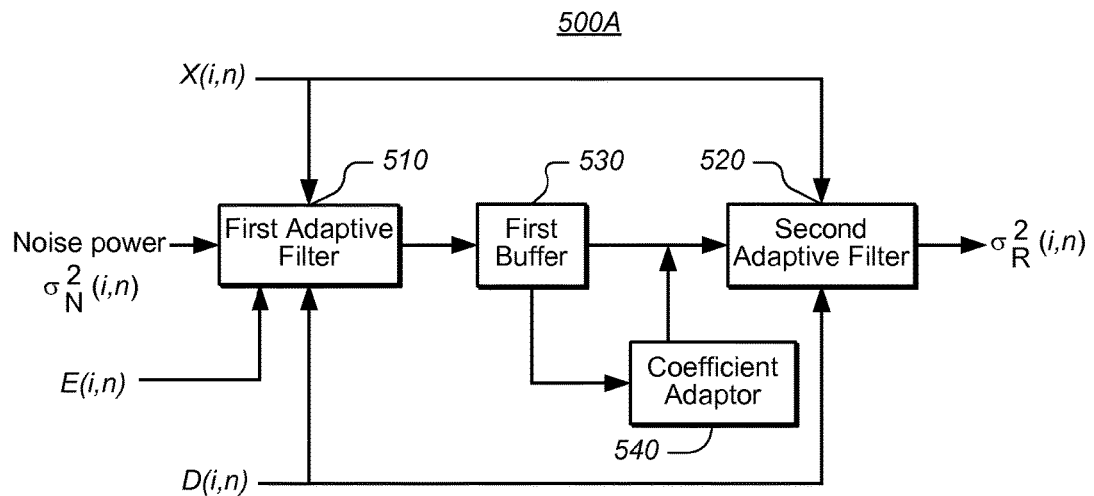
FIGS. 3-7 are diagrams illustrating variations of the acoustic echo mitigation apparatus according to the embodiment as shown in FIG. 2.
Figure 5:
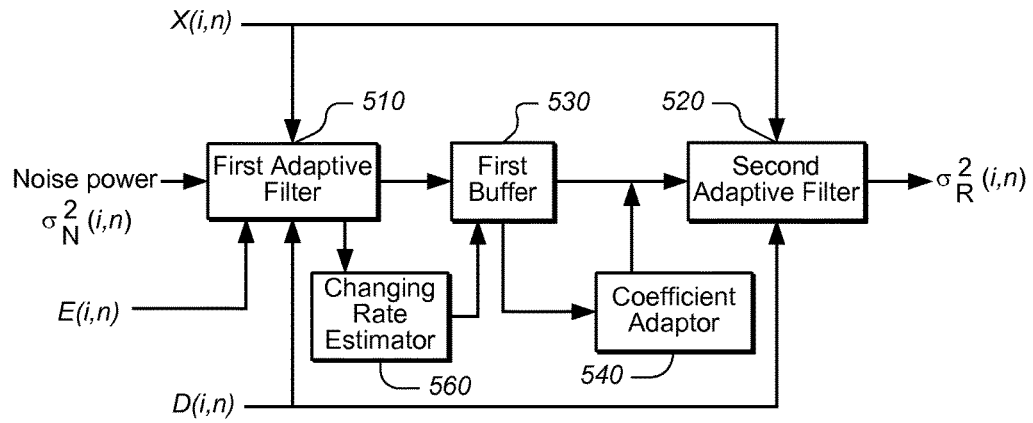
Figure 6:
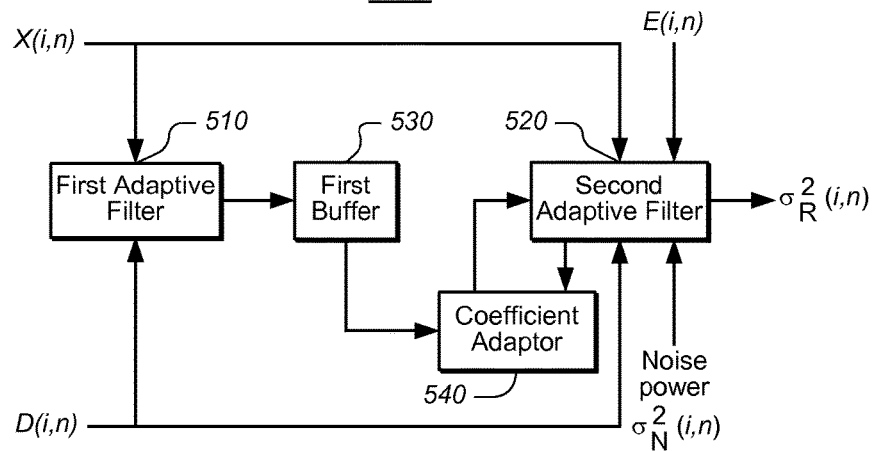
Figure 7:
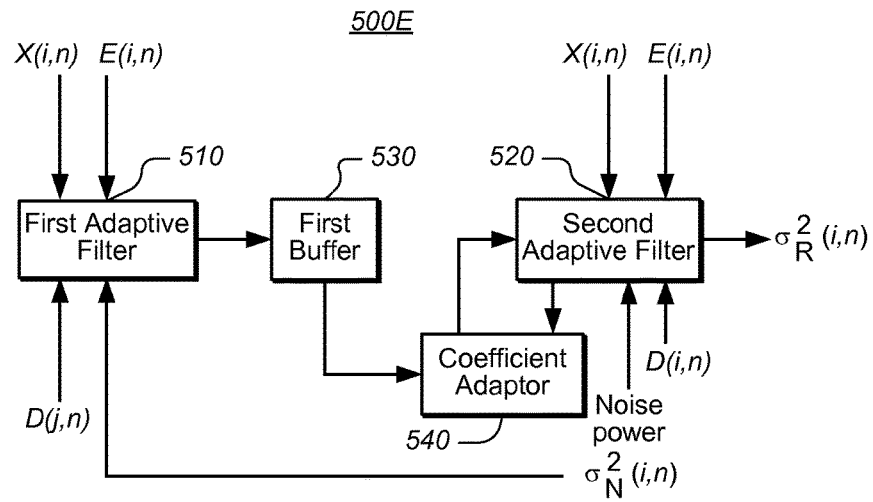

FIGS. 6 and 7 show another construction of the first and second adaptive filters different from that shown in FIGS. 3-5.

That is, similar to the first embodiment, the first adaptive filter 510 is configured to implicitly track the change of the power of the error signal from the AEC, while the second adaptive filter 520 is configured to directly estimate the residual echo power and update its own coefficient set independently from the first adaptive filter 510, and the coefficient set of the second adaptive filter will be adjusted only when the statistics of the coefficient set of the first adaptive filter demonstrate such necessity.

Then in this second embodiment, since in most cases the second adaptive filter 520 itself should be enough to obtain the real residual echo power without reference to the minimum statistics of the norm of the coefficient set of the first adaptive filter 510, the parameter settings of the second adaptive filter 520 for estimating the residual echo power and updating the coefficient set should be different from that of the first adaptive filter 510 in the first embodiment, although the second adaptive filter in the second embodiment adopts an algorithm similar to the first adaptive filter in the first embodiment. Specifically, the algorithm in the second adaptive filter 520 may be:

Calculating the residual echo power:

$$\sigma_R^2(i,n) = L_{FG}^T(i,n-1)\tilde{X}^2(i,n) \qquad (14')$$

Computing the error signal output from the second adaptive filter:

$$\hat{E}(i,n) = \tilde{E}(i,n) - \sigma_R^2(i,n) - \sigma_N^2(i,n) \quad (15')$$

Updating filter coefficient set:

$$L_{FG}(i, n) = L_{FG}(i, n-1) + \frac{\mu_{FG}}{P_{x2}(i, n) + \epsilon} \tilde{X}^2(i, n) \hat{E}(i, n) \quad (16')$$

Where $\mu_{FG}$ is a fixed value or a dynamic value depending on external factors such as spatial properties (for multi-channel echo control), coherence between send and receive or error and receive signals, or event information from other double talk detectors, etc. For fixed $\mu_{FG}$, generally $\mu_{FG} > \mu_{BG}$ such that the background filter adapts slower than the foreground filter. For example, $\mu_{FG} = 1.2\mu_{BG}$ but not limited thereto. For dynamically varying $\mu_{FG}$, it can be the optimal step size as that in formulas (4) or (5) when AES is used alone.

Furthermore, in this embodiment, the first adaptive filter just functions as a subsidiary or auxiliary filter where the second adaptive filter will be adjusted according to the first adaptive filter only under certain conditions. An example rule is defined below:

$$L_{FG}(i, n) = \begin{cases} L_{FG}(i, n)S_i, & \text{if } N_{BG}^{min}(i, n)C < N_{FG}(i, n-1) \\ L_{FG}(i, n) & \text{otherwise} \end{cases} \quad (21)$$

Where C is a predefined constant (C>1), such as 1.2 but not limited thereto. This formula implies the second adaptive filter will be adjusted with a scaling factor Si according to the first adaptive filter if the norm of the coefficient set of the second adaptive filter for the last frame is greater than C times of the minimum norm as discussed before for the first adaptive filter. In other words, the condition is that the minimum norm is sufficiently smaller than the norm of the coefficient set of the second adaptive filter for the last frame.

Therefore, according to the second embodiment, as shown in FIG. 6, the second adaptive filter 520 may be configured to obtain the final estimate of the residual echo power and update its coefficient set based on history of smoothed versions of reference signal power, a smoothed version of the error signal, and the noise power. Wherein the minimum statistics is the minimum norm among the norms of the coefficient sets held in the first buffer 530, and the coefficient adaptor 540 may be configured to adjust the coefficient set of the second adaptive filter 520 where the minimum norm is less than a second threshold determined based on the norm of the coefficient set of the second adaptive filter 520 for the last frame.

The scaling factor Si may be:

$$S_i = \frac{N_{BG}(i, n)}{N_{FG}(i, n)} \quad (22)$$

That is, the coefficient adaptor 540 may be configured to adjust the coefficient set of the second adaptive filter 520 with a scaling factor determined as a ratio of the norm of the coefficient set of the first adaptive filter 510 over the norm of the coefficient set of the second adaptive filter 520.

In the embodiment, both the first and second adaptive filters work as usual for each frame and each frequency bin, and thus the complexity would be a problem to the storage capacity and the MIPS of the system. So, in a variant of the embodiment, it is meaningful to group the frequency bins for the first adaptive filter to reduce the complexity.

That is, as shown in FIG. 7, we can group the frequency bins (index i) into fewer frequency bands (index j) for the first adaptive filter, such as only one band (the whole band), two bands (such as a high frequency band and a low frequency band), or more than two bands but fewer than the number of all the frequency bins. For each band (comprising a plurality of frequency bins indexed with i), we can get one set of coefficients according to formulae similar to formulae (14)-(16):

Calculating preliminary estimate of the residual echo power:

$$\tilde{\sigma}_R^2(j,n) = L_{BG}^T(j,n-1)\tilde{X}^2(j,n) \quad (14'')$$

Computing the error signal output from the first adaptive filter:

$$\hat{E}(j,n) = \tilde{E}(j,n) - \tilde{\sigma}_R^2(j,n) - \sigma_N^2(j,n) \quad (15'')$$

Updating filter coefficient set:

$$L_{BG}(j, n) = L_{BG}(j, n-1) + \frac{\mu_{BG}}{P_{x2}(j, n) + \epsilon} \tilde{X}^2(j, n) \hat{E}(j, n) \quad (16'')$$

$$P_{x2}(j, n) = \sum_{p=0}^{M'-1} |\tilde{X}^2(j, n-p)|^2 \quad (17'')$$

Where all the symbols used in above formulae (14") to (16") have the same meaning as those symbols used in formulae (14) to (16), just with the index i for frequency bins replaced with the index j for frequency bands.

Thus, we can use the result of the first adaptive filter 510 for only fewer frequency bands to indicate whether the coefficient set of the second adaptive filter needs to be adjusted, and reduce the complexity. However, since the second adaptive filter 520 must provide residual echo power for each frequency bin to be further used by the AEC and the AES, there is a problem of how to obtain the scaling factor.

Then, in a further variant, we may use the mean of the norms of the coefficient sets (for the second adaptive filter 520) over the frequency bins comprised in each frequency band to calculate the scaling factors for respective frequency bins in the frequency band.

Note that the processing discussed in this application is performed in frequency domain, and all the algorithms/components discussed hereinbefore are with respect to each frequency bin (index i). However, in the description hereinbefore, all the operations are the same with respect to each frequency bin, and thus we do not emphasize the frequency bin hereinbefore although all the formulae contain the index i.

Now in this variant, we will involve different frequency bins and different frequency bands. In terms of frequency bins/bands, all the components discussed hereinbefore function for each frequency bin/band and it may be regarded that there are, for each component, multiple replicates corresponding to the number of frequency bins/bands. But for conciseness, in the present application we regard the replicates still as one single component.

Turn back to the calculation of the scaling factor. Assume a frequency band comprises F frequency bins, we can compute the scale factor as below:

$$S_i = \frac{N_{BG}(j,n)}{(\sum_i N_{FG}(i,n))/F}, \text{ frequency bin } i \in \text{frequency band } j \quad (23)$$

That is, in this variant as shown in FIG. 7, the first adaptive filter 510 is configured to work with respect to at least one frequency band j each comprising a plurality of frequency bins i, the second adaptive filter 520 is configured to work with respect to each frequency bin, and the coefficient adaptor is configured to adjust the coefficient set of the second adaptive filter with respect to each frequency bin with a scaling factor determined as a ratio of the norm of the coefficient set of the first adaptive filter with respect to a corresponding frequency band over the mean of the respective norms of respective coefficient sets of the second adaptive filter for respective frequency bins in the corresponding frequency band.

In this way, the first adaptive filter 510 will consume less resource.

Echo Path Estimator

The AES is for further suppressing the residual acoustic echo not completely cancelled by the AEC. But when the AEC works well enough, it is unnecessary for the AES to consume the resource. Or, when there is little acoustic echo such as when using a headset, the AES (and even the AEC) is also unnecessary.

Figure 8:
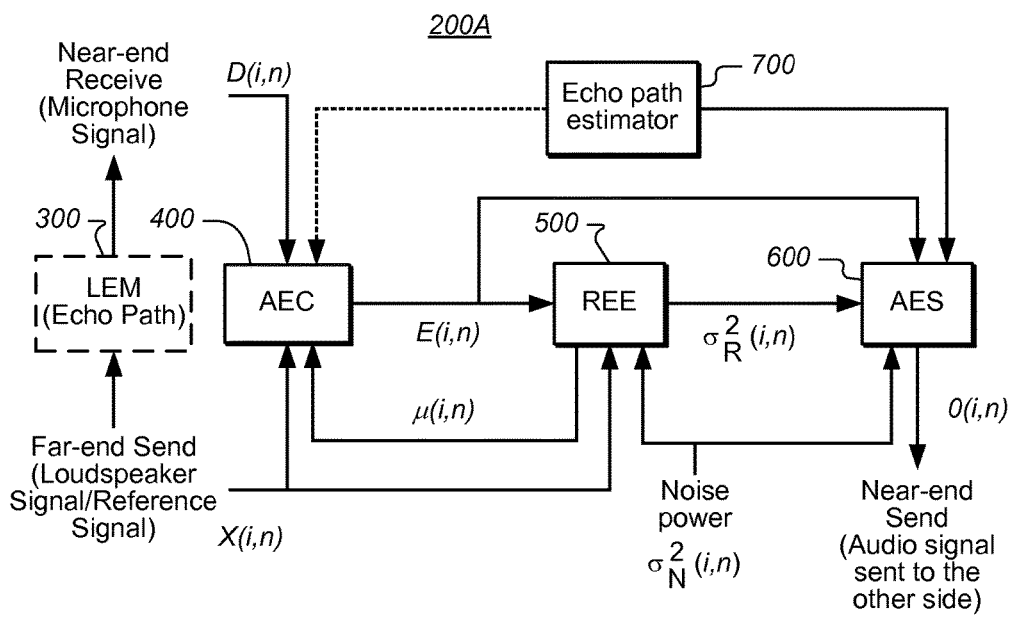
FIG. 8 is a diagram illustrating an acoustic echo mitigation apparatus according to another embodiment of the application.

Therefore, in another embodiment as shown in FIG. 8, an echo path estimator (EPE) 700 is provided for estimating the significance of the echo path, and switching off the acoustic echo canceller and/or the acoustic echo suppressor when the echo path is of low significance.

The echo path estimator 700 may be a high level information detector. For example, it may be a headset detector for detecting whether a headset is plugged into its jack, and such detection may be realized with existing techniques. When a headset is detected, meaning the echo path is of low significance, the AES and/or the AEC may be switched off.

The echo path estimator 700 can also be realized by continuously tracking the first adaptive filter coefficients in the REE block over a predefined period of time. In particular, as discussed before, minimum statistics such as minimum norm of the coefficient set of the first adaptive filter is obtained. Let $N_{EPE}(n)$ denote the sum of the minimum norms of the first adaptive filter for all the frequency bins at frame n, $$N_{EPE}(n) = \Sigma_i N_{BG}^{min}(i,n) \quad (24)$$

Then it can be determined the echo path is of low significance if $N_{HDS}(n) < TH3$ for $K_1$ consecutive observations, where TH3 and $K_1$ are both predefined constants. That is, the norm of the coefficient set of the first adaptive filter must be small enough for a period of time in order for switching off the AES and/or AEC. In the proposed embodiment, TH3 may be set to −40 db to −60 db while $K_1$ may be set to give the buffer a length of 5 seconds to 30 seconds, such as 20 seconds, respectively. The output of the EPE 700 is used to enable/disable the AES and/or the AEC consequently.

Furthermore, in order to make the system more robust against any echo path change, if the echo path becomes significant again (such as if the user unplugs the headset), the EPE also needs to detect that and enable the AES and/or the AEC. This is done in a similar way as discussed above. In particular, the AES and/or the AEC may be enabled again if $N_{EPE}(n) > TH3$ for $K_2$ consecutive observations, where $K_2$ may be set to give the buffer a length of 3 to 6 seconds, such as 5 seconds. It should be noted that $K_2$ may be set less than $K_1$ to allow more swift recovery of AES and/or AEC once echo comes back.

Figure 9:
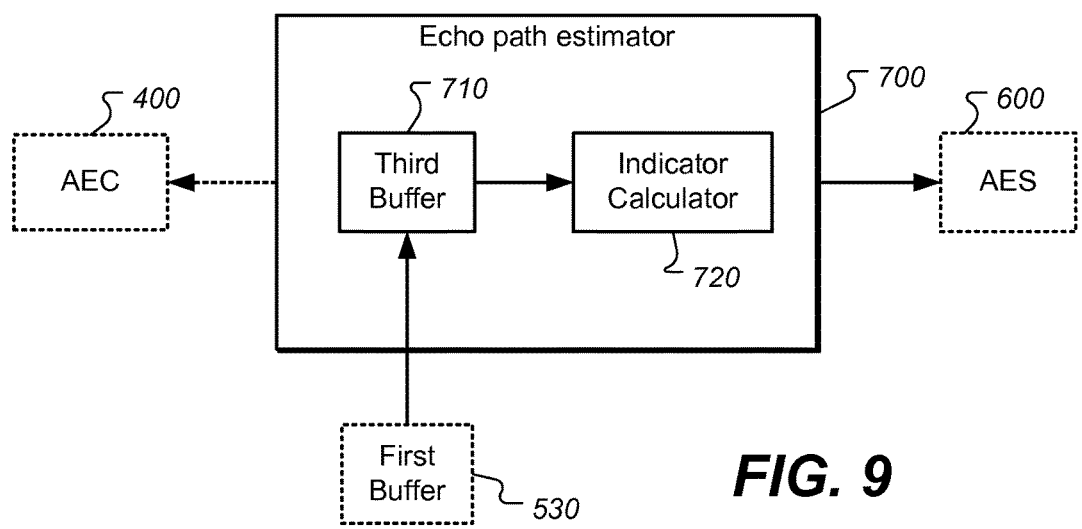
FIG. 9 is a diagram illustrating an acoustic echo mitigation apparatus according to a variation of the embodiment as shown in FIG. 8.

In the above embodiment the minimum statistics from the coefficient set held in the first buffer 530 are used, that is, the EPE 700 uses the same sliding window having a length of Q frames. However, the EPE 700 may also use a sliding window different in length from the first buffer 530. Therefore, in a variant as shown in FIG. 9, the echo path estimator 700 further comprises: a third buffer 710 for holding norms of coefficients set of the first adaptive filter 510 for a fourth number of past frames, wherein for each frequency bin and for the present frame, there is a minimum norm among the norms held in the third buffer; an indicator calculator 720 for calculating a sum of respective minimum norms for respective frequency bins; and the echo path estimator may be configured to switch the acoustic echo canceller and/or the acoustic echo suppressor off where the sum is less than a third threshold for a fifth number ($K_1$) of consecutive observations; and/or on where the sum is not less than the third threshold for a sixth number ($K_2$) of consecutive observations. Wherein the fourth number may be represented by T, which may be equal to Q, or may be different from Q.

When T is equal to Q, the obtaining of the minimum statistics such as the minimum norm may share the same operation as discussed in the embodiments related to the REE. When T is greater than Q, the obtaining of the minimum statistics such as minimum may be simplified by making use of the result in the embodiments related to the REE. That is, considering that the REE has obtained the minimum norm for Q frames, the third buffer 710 may only hold the minimum norms for every Q frames, then a long-term minimum norm may be found out from the minimum norms held in the third buffer 710. In such a case, T is generally an integer multiple of Q. Thus, in a further variant, the third buffer 710 may be configured for holding the minimum norms for a fourth number (T) of past frames, wherein for each frequency bin and for the present frame, there is a long-term minimum norm among the minimum norms held in the third buffer; and the indicator calculator 720 may be configured for calculating a sum of respective long-term minimum norms for respective frequency bins. And the echo path estimator 700 is configured to switch the acoustic echo canceller and/or the acoustic echo suppressor off where the sum is less than a third threshold for a fifth number of consecutive observations; and/or on where the sum is not less than the third threshold for a sixth number of consecutive observations.

the EPE block may run every T frames and therefore $TK_1$ frames are needed to claim the low-echo mode while $TK_2$ frames are required to recover from the low-echo mode. Hence, depending on the frame length (generally 20 ms but not limited thereto), T and designed response time (such as 20 s or 5 s mentioned before), $K_1$ and $K_2$ can be worked out, respectively. Alternatively, a sliding window of T frames may be used (with the sliding step-size being one or more frames). That is, the EPE block may run every one or more frames to check the long-term minimum norm in the sliding window. In such a situation, $K_1$ or $K_2$ multiplied with the step-size and further added with T, will be the designed response time.

Combination of Embodiments and Application Scenarios

All the embodiments and variants thereof discussed above may be implemented in any combination thereof, and any components mentioned in different parts/embodiments but having the same or similar functions may be implemented as the same or separate components.

For example, the embodiments shown in FIGS. 3-5 and the variants thereof may be implemented in any combination thereof; and these implementations may be further combined with any embodiments and/or variants described with reference to FIG. 2, and/or those embodiments and/or variants described with reference to FIGS. 8 and 9. Furthermore, the embodiment and/or variants described with reference to FIGS. 2 and 6-9 may also be implemented in any combination thereof.

Figure 10:
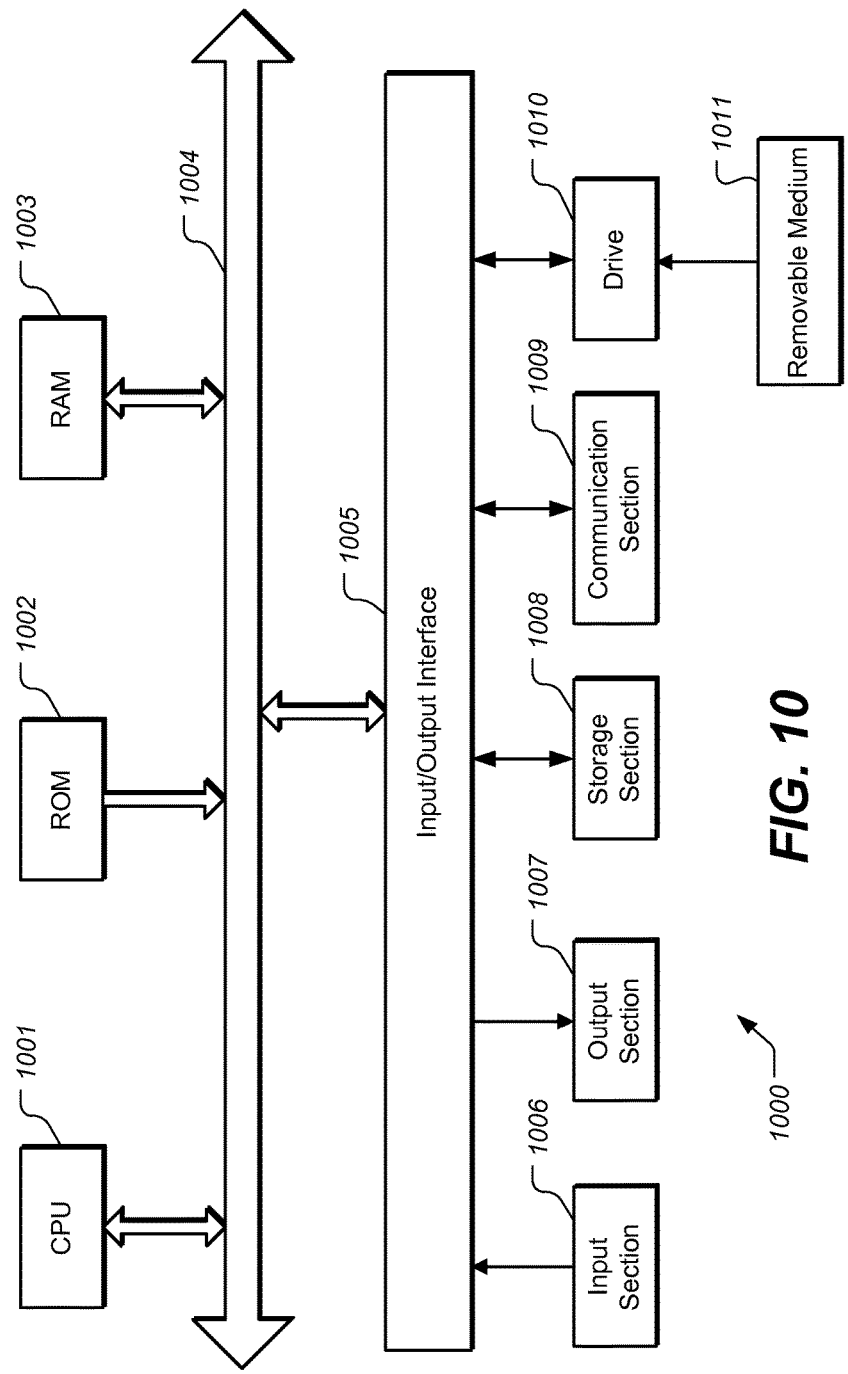
FIG. 10 is a block diagram illustrating an exemplary system for implementing embodiments of the present application.

As discussed at the beginning of the Detailed Description of the present application, the embodiment of the application may be embodied either in hardware or in software, or in both. FIG. 10 is a block diagram illustrating an exemplary system for implementing the aspects of the present application.

In FIG. 10, a central processing unit (CPU) 1001 performs various processes in accordance with a program stored in a read only memory (ROM) 1002 or a program loaded from a storage section 1008 to a random access memory (RAM) 1003. In the RAM 1003, data required when the CPU 1001 performs the various processes or the like are also stored as required.

The CPU 1001, the ROM 1002 and the RAM 1003 are connected to one another via a bus 1004. An input/output interface 1005 is also connected to the bus 1004.

The following components are connected to the input/output interface 1005: an input section 1006 including a keyboard, a mouse, or the like; an output section 1007 including a display such as a cathode ray tube (CRT), a liquid crystal display (LCD), or the like, and a loudspeaker or the like; the storage section 1008 including a hard disk or the like; and a communication section 1009 including a network interface card such as a LAN card, a modem, or the like. The communication section 1009 performs a communication process via the network such as the internet.

A drive 810 is also connected to the input/output interface 1005 as required. A removable medium 811, such as a magnetic disk, an optical disk, a magneto-optical disk, a semiconductor memory, or the like, is mounted on the drive 810 as required, so that a computer program read there from is installed into the storage section 1008 as required.

In the case where the above-described components are implemented by the software, the program that constitutes the software is installed from the network such as the internet or the storage medium such as the removable medium 811.

In addition to general-purpose computing apparatus, the embodiments of the present application may also be implemented in a special-purpose computing device, which may be a part of any kind of audio processing apparatus or any kind of voice communication terminal.

Acoustic Echo Mitigation Method

In the process of describing the acoustic echo mitigation apparatus in the embodiments hereinbefore, apparently disclosed are also some processes or methods. Hereinafter a summary of these methods is given without repeating some of the details already discussed hereinbefore, but it shall be noted that although the methods are disclosed in the process of describing the acoustic echo mitigation apparatus, the methods do not necessarily adopt those components as described or are not necessarily executed by those components. For example, the embodiments of the acoustic echo mitigation apparatus may be realized partially or completely with hardware and/or firmware, while it is possible that the acoustic echo mitigation method discussed below may be realized totally by a computer-executable program, although the methods may also adopt the hardware and/or firmware of the acoustic echo mitigation apparatus.

The methods will be described below with reference to FIGS. 11-17.

Figure 11:
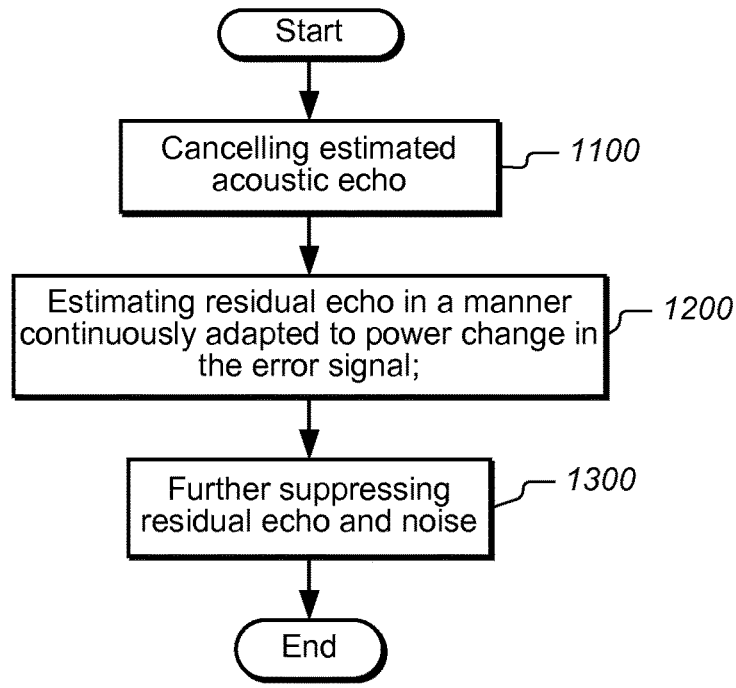
FIGS. 11-17 are flow charts illustrating acoustic echo mitigation methods for according to embodiments of the present application and some variations thereof.

As shown in FIG. 11, an embodiment of the acoustic echo mitigation method in the present application may include: cancelling (operation 1100, AEC), with an acoustic echo canceller, estimated acoustic echo from a microphone signal, resulting in an error signal; estimating (operation 1200) residual echo power based on the error signal in a manner continuously adapted to power change in the error signal; and further suppressing (operation 1300, AES), with an acoustic echo suppressor, residual echo and noise in the error signal based on the residual echo power and noise power.

The operation 1100 of cancelling the estimated acoustic echo and the operation 1200 of further suppressing the residual echo noise may be realized with many existing techniques. In the present application, the operation of cancelling the estimated acoustic echo may be performed based on an NLMS-based algorithm, and the step size of the NLMS-based algorithm may be updated based on the residual echo power and the power of the error signal. In a variant, the step size of the NLMS-based algorithm may be updated based on the residual echo power and an expectation of the power of the error signal.

Further, in the present application, the operation of further suppressing the residual echo may comprise applying to the error signal a gain determined based on the power of the error signal, the residual echo power and the noise power.

In the embodiments and variants discussed above, the noise power may be obtained by many existing techniques not to be discussed in detail here.

Figure 12:
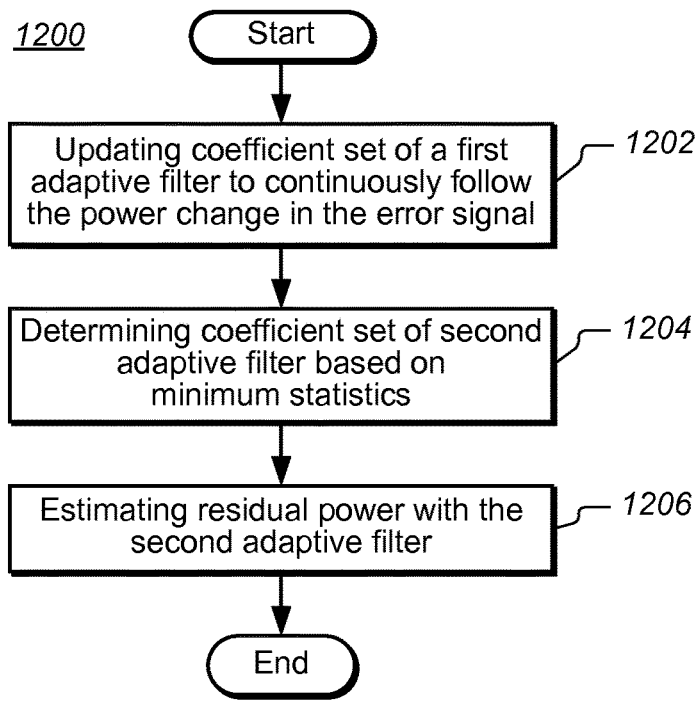

According to another embodiment, as shown in FIG. 12, the operation 1200 of estimating the residual echo power may further comprise: adaptively updating (operation 1202) the coefficient set of a first adaptive filter during a process of obtaining a preliminary estimate of the residual echo power, so that the coefficient set continuously follows the power change in the error signal; determining (operation 1204) the coefficient set of a second adaptive filter for the present frame based on the minimum statistics of the norms of the coefficient sets of the first adaptive filter for a first number of past frames; and obtaining (operation 1206) a final estimate of the residual echo power with the second adaptive filter. Here, the minimum statistics of the norms may comprise minimum norm or minimum derivative of first order or higher order of the norms along the time line (with respect to the frame index n).

Here, the operation 1202 of adaptively updating the coefficient set of the first adaptive filter is based on history of smoothed versions of reference signal power, a smoothed version of the error signal, and the noise power.

And the operation 1206 of obtaining the final estimate may be configured to obtain the final estimate of the residual echo power based on history of reference signal power. The operation 1204 of determining the coefficient set may comprise finding the minimum statistics among the coefficient sets for the first number of past frames (operation 12041 in FIG. 13, or operation 12042 in FIG. 14), and choosing the corresponding coefficient set, such as the coefficient set having the minimum norm, as the coefficient set of the second adaptive filter (operation 12046 in FIG. 13 and FIG. 14)

Some limitations may be imposed to avoid diverging of the coefficient set under unstable conditions. Therefore, the operation 1204 of determining the coefficient set may be configured to use the coefficient set for the last frame (operation 12048 in FIG. 13) if the fluctuation of the norms of the coefficient sets for the first number of past frames reaches a predetermined degree ("Y" in operation 12043). The degree of the fluctuation may be measured with the ratio of the maximum statistics over the minimum statistics of the norms of the coefficient sets for the first number of past frames, such as the ratio of the maximum norm over the minimum norm.

Figure 14:
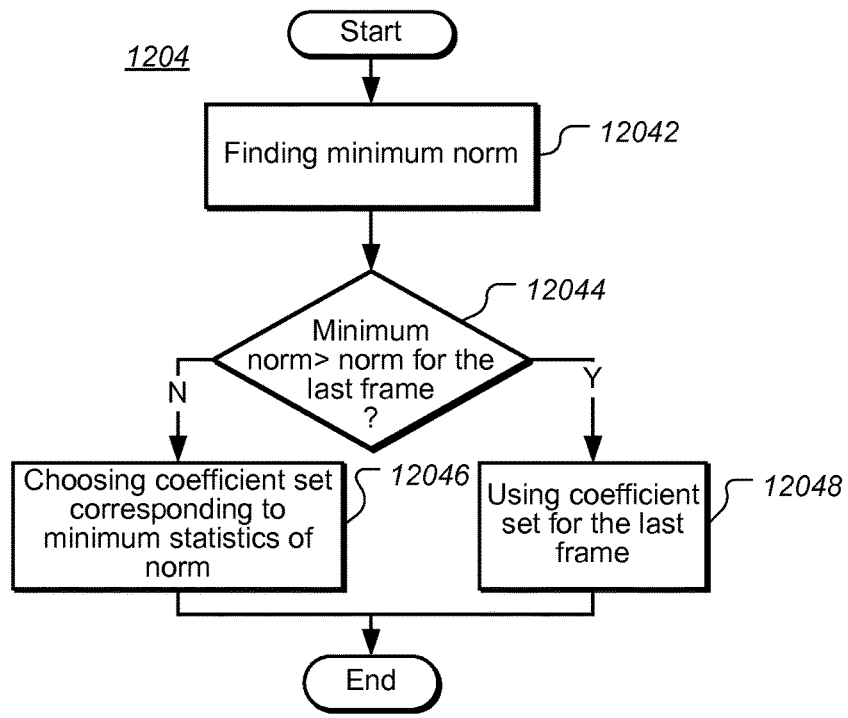

In another variation as shown in FIG. 14, for more closely tracking of the "real" residual echo level and implicitly distinguishing the power change caused by double talk or noise etc., the method may retain the history minimum statistics as much as possible. Therefore, the operation 1204 of determining the coefficient set may be configured to find the minimum norm among the norms of the coefficient sets for the first number of past frames (operation 12042), and use the coefficient set for the last frame (operation 12048) if the minimum norm is greater than the norm of the coefficient set of the second adaptive filter for the last frame ("Y" in operation 12044).

Figure 13:
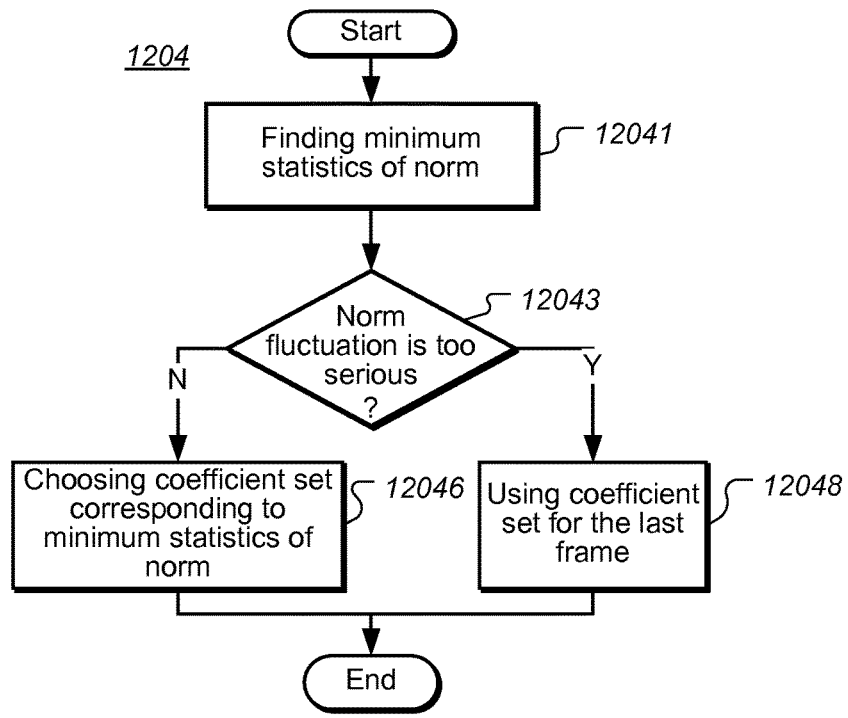

The variants shown in FIG. 13 and FIG. 14 may be combined together.

In the above embodiments and variants, a sliding window for determining the first number of frames to obtain the minimum statistics is used. The first number is the length of the sliding window, and may be adjusted depending on scenarios. For example, the first number may be decreased where suppressing echo is more important than preserving double talk speech quality, and increased otherwise. That is, if there is little double talk and the main task is to cancel/suppress the acoustic echo, then the first number may be decreased.

Whether acoustic echo or double talk is dominant may be determined from high level information such as the type of the audio processing apparatus (such as conference call system or mobile device), or the use of headset or loudspeaker. In a variant proposed in this application, it can also be determined by making use of the results from the first adaptive filter. For example, we can calculate a changing rate of the norm of the coefficient set of the first adaptive filter, and the first number may be decreased if the changing rate is less than a fourth threshold for a seventh number of consecutive observations; and/or increased if the changing rate is not less than the fourth threshold for an eighth number of consecutive observations.

In the embodiments and variants discussed above, although the final estimate of the residual echo is given by the second adaptive filter, the first adaptive filter plays a dominant role for determining the coefficient set of the second adaptive filter.

Figure 15:
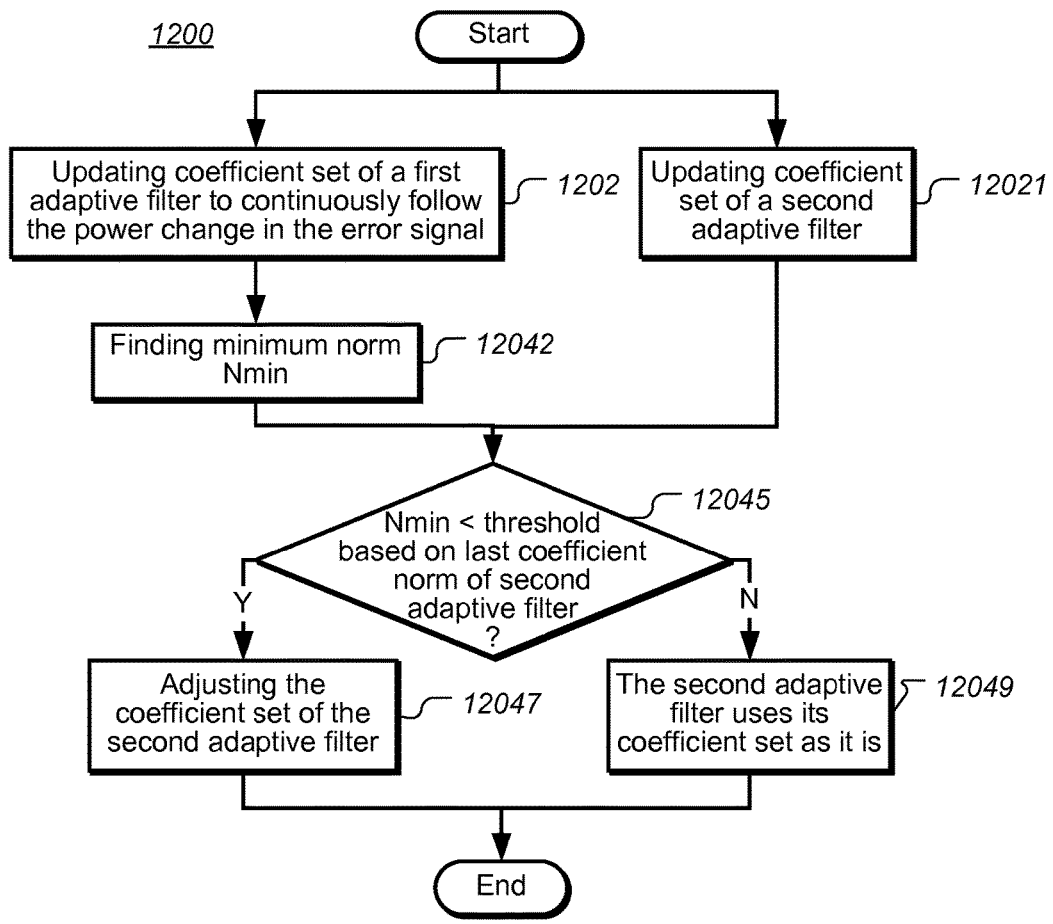
Figure 16:
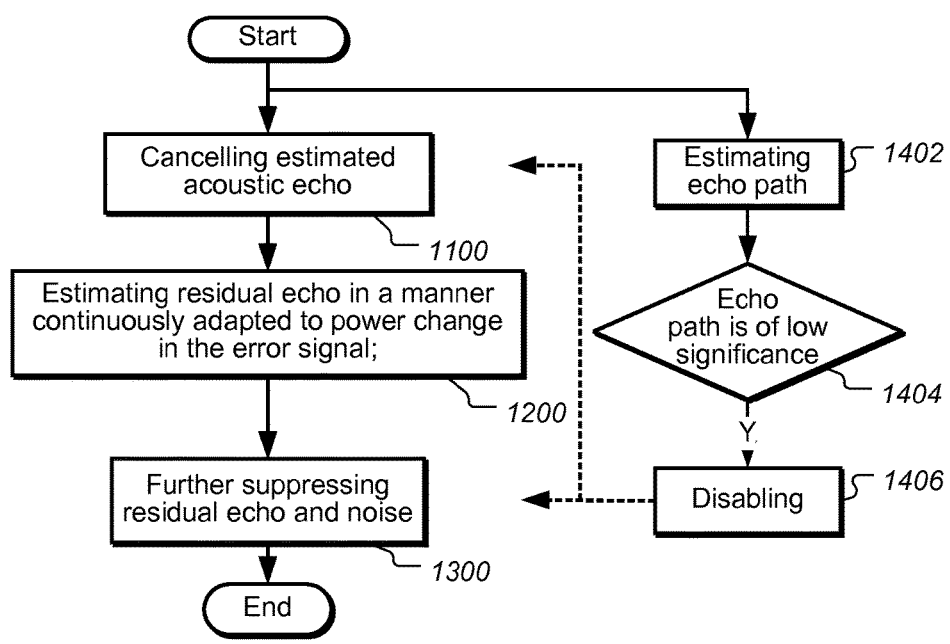
Figure 17:
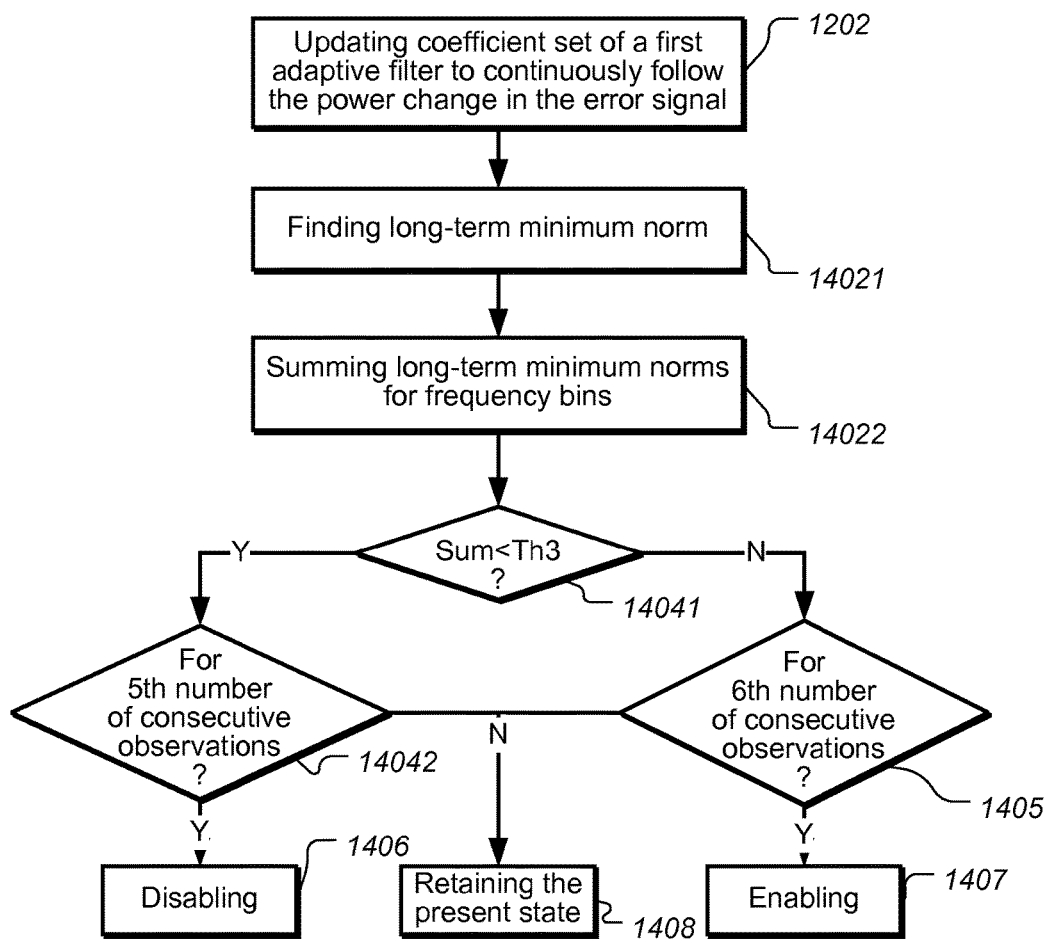

In another embodiment shown in FIG. 15, the second adaptive filter plays a dominant role both in giving the final estimate of the residual echo power and in determining its own coefficient set, with its coefficient set adjusted only under certain conditions.

In this embodiment, the operation 12021 of obtaining the final estimate of the residual echo power is based on history of smoothed versions of reference signal power, a smoothed version of the error signal, and the noise power. While the first adaptive filter may be the same, that is, update its coefficient set to continuously follow the power change in the error signal (operation 1202) and find the minimum statistics (the minimum norm) among the norms of the coefficient sets of the first adaptive filter for the first number of past frames (operation 12042). Then, the operation 1204 of determining the coefficient set of the second adaptive filter may be configured to adjust (operation 12047) the coefficient set of the second adaptive filter where the minimum norm is less than a second threshold determined based on the norm of the coefficient set of the second adaptive filter for the last frame ("Y" in operation 12045). Otherwise the second adaptive filter uses its coefficient set as it is ("N" in operation 12045 and operation 12049).

The adjusting operation 12047 may use a scaling factor, which may be a ratio of the norm of the coefficient set of the first adaptive filter over the norm of the coefficient set of the second adaptive filter.

In the above embodiment, both the first adaptive filter and the second adaptive filter work in similar manners. For simplifying the solution and reducing resource consuming, in a variant it is proposed to group the frequency bins into fewer frequency bands for the first adaptive filter. That is, the operation of adaptively updating the coefficient set of the first adaptive filter is performed with respect to at least one frequency band each comprising a plurality of frequency bins, the operation of obtaining the final estimate of the residual echo power is performed with respect to each frequency bin. And the operation of determining the coefficient set of the second adaptive filter may comprise: determining a ratio of the norm of the coefficient set of the first adaptive filter with respect to each frequency band over the mean of the respective norms of respective coefficient sets of the second adaptive filter for respective frequency bins in the frequency band; and adjusting the coefficient set of the second adaptive filter with respect to each frequency bin with the ratio as a scaling factor.

For reducing resource consumption, the AES and even the AEC may be disabled when the echo path is of low significance, or the echo is below a threshold. Therefore, in another embodiment, we may first estimate the significance of the echo path (operation 1402 in FIG. 16). If the echo path is of low significance ("Y" in operation 1404), then the operation of cancelling the estimated acoustic echo and/or the operation of further suppressing the residual echo are not performed (operation 1406).

The information about the echo path may be obtained from high level information such as the use of headset or loudspeaker, and may also be obtained by observing the minimum statistics from the operation of the first adaptive filter for updating its coefficient set (operation 1202). The minimum statistics may be the minimum norm among the norms of the coefficient sets for the first number of past frames. Then, the operation of estimating the significance of the echo path may further comprise: finding (operation 14021), for each frequency bin and for the present frame, a long-term minimum norm among the minimum norms for a fourth number of past frames; calculating (operation 14022) a sum of respective long-term minimum norms for respective frequency bins. The operation of cancelling the estimated acoustic echo and/or the operation of further suppressing the residual echo are not performed (operation 1406) where the sum is less than a third threshold ("Y" in operation 14041) for a fifth number of consecutive observations ("Y" in operation 14042); and/or are performed (operation 1407) where the sum is not less than the third threshold ("N" in operation 14041) for a sixth number of consecutive observations ("Y" in operation 1405). In other situations of course, the AES and the AEC would maintain their current states (operation 1408). The fourth number may be not less than the first number.

In an alternative solution, the long-term minimum may be directly found, for each frequency bin and for the present frame, from the norms for a fourth number of past frames, but not from the minimum norms for every first number of past frames.

EXAMPLES

Two examples are given to illustrate the effects of the proposed embodiments in terms of estimating the residual echo power in different scenarios.

Figure 18:
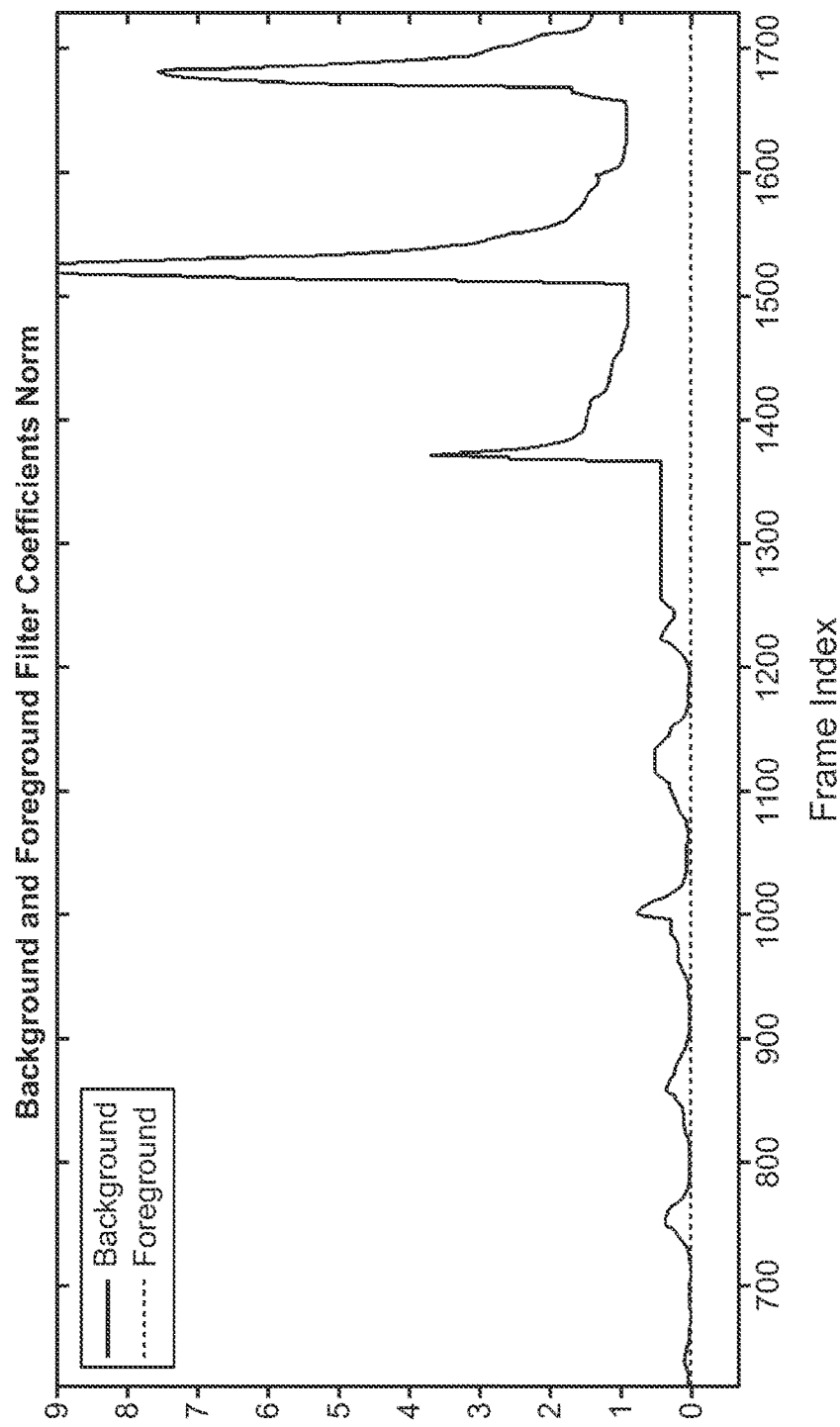
FIGS. 18-19 are graphs illustrating the effects of the embodiments of the present application.

FIG. 18 illustrates the coefficient norms for the coefficient sets of the first adaptive filter (background filter) and the second adaptive filter (foreground filter) for single talk followed by double talk (which takes place after frame 1370). In this case, the echo path is stable. It can be seen that the coefficient norm of the second adaptive filter remain unchanged during double talk. Hence, the residual echo power estimation is not affected by double talk. However, in FIG. 18, if the size of the sliding window is smaller, or if the double talk continues, in the right part of the graph the foreground coefficient norm might rise to the valley value of the background coefficient norm.

Figure 19:
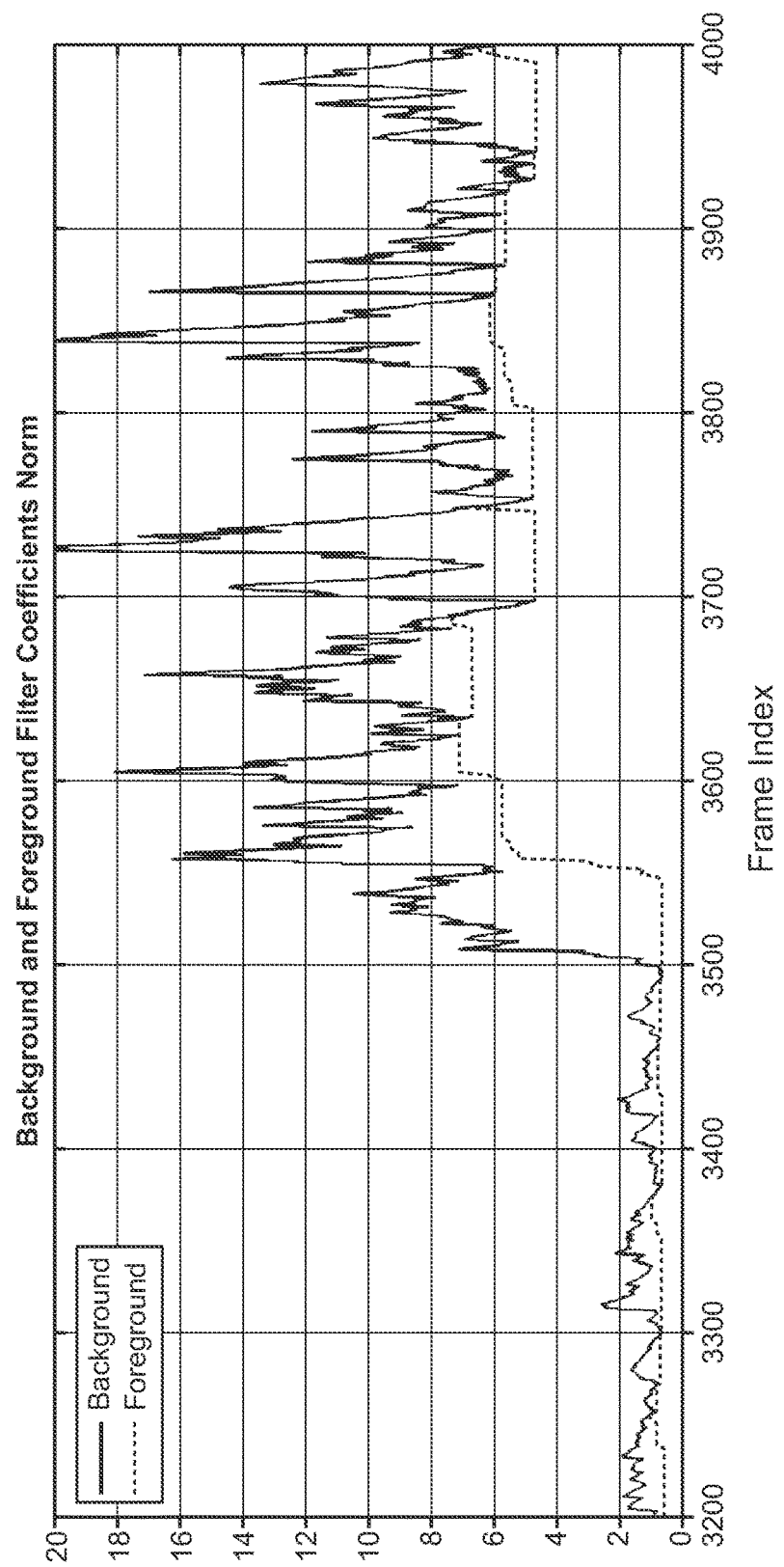

FIG. 19 shows the background and foreground coefficient norms for single talk (echo only) where there is an abrupt echo path jump at frame 3500. The two filters were both initialized with zero coefficients but as time progresses the coefficient set of the first adaptive filter is, in most cases, of larger norm than the second adaptive filter. It should be noted that the frame index starts around 3200 (with about the first 3100 frames omitted). It can be seen that the coefficient norm of the second adaptive filter follows up to the minimum norm of the coefficient set of the first adaptive filter with certain delay. Therefore, the residual echo power estimation can quickly trace the echo path change.

From the above two figures, it can be seen that the proposed embodiments are robust against double talk while remaining aggressive whenever the echo path changes (which results in increase or decrease in the residual echo power).

Please note the terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, operations, steps, elements, and/or components, but do not preclude the presence or addition of one or more other features, integers, operations, steps, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present application has been presented for purposes of illustration and description, but is not intended to be exhaustive or limited to the application in the form disclosed. Many modifications and variations will be apparent to those of ordinary skill in the art without departing from the scope and spirit of the application. The embodiment was chosen and described in order to best explain the principles of the application and the practical application, and to enable others of ordinary skill in the art to understand the application for various embodiments with various modifications as are suited to the particular use contemplated.

What is claimed is:

1. An acoustic echo mitigation method, comprising:
    cancelling, with an acoustic echo canceller, estimated acoustic echo from a microphone signal, resulting in an error signal;
    estimating residual echo power based on the error signal in a manner continuously adapted to power change in the error signal, wherein a residual echo estimation is obtained and a step size is updated based on the residual echo estimation; and
    further suppressing, with an acoustic echo suppressor, residual echo and noise in the error signal based on the residual echo power and noise power,
    wherein the cancelling comprises updating a transfer function for estimating the acoustic echo based on the updated step size and is implemented by one or more processors and memory.

2. The acoustic echo mitigation method according to claim 1, wherein an operation of estimating the residual echo power further comprises:
    adaptively updating a coefficient set of a first adaptive filter during a process of obtaining a preliminary estimate of the residual echo power, so that the coefficient set continuously follows the power change in the error signal;
    determining the coefficient set of a second adaptive filter for a present frame based on minimum statistics of the norms of the coefficient sets of the first adaptive filter for a first number of past frames; and
    obtaining a final estimate of the residual echo power with the second adaptive filter.

3. The acoustic echo mitigation method according to claim 2, wherein the minimum statistics of the norms comprises minimum norm or minimum absolute value of derivative of first order of the norms along a time line.

4. The acoustic echo mitigation method according to claim 2, wherein,
    the operation of obtaining the final estimate is configured to obtain the final estimate of the residual echo power based on history of reference signal power, and
    the operation of determining the coefficient set is configured to choose the coefficient set, a norm of which is of the minimum statistics among the coefficient sets for the first number of past frames.

5. The acoustic echo mitigation method according to claim 4, wherein the operation of determining the coefficient set is configured to use the coefficient set for a last frame if the fluctuation of the norms of the coefficient sets for the first number of past frames reaches a predetermined degree.

6. The acoustic echo mitigation method according to claim 4, wherein the operation of determining the coefficient set is configured to use the coefficient set for a last frame if the ratio of maximum statistics over the minimum statistics of the norms of the coefficient sets for the first number of past frames reaches a first threshold.

7. The acoustic echo mitigation method according to claim 4, wherein the minimum statistics is a minimum norm among the norms of the coefficient sets for the first number of past frames, and the operation of determining the coefficient set is configured to use the coefficient set for a last frame if the minimum norm is greater than the norm of the coefficient set of the second adaptive filter for the last frame.

8. The acoustic echo mitigation method according to claim 6, wherein an operation of adaptively updating the coefficient set of the first adaptive filter is based on history of smoothed versions of reference signal power, a smoothed version of the error signal, and the noise power.

9. The acoustic echo mitigation method according to claim 2, wherein the first number is decreased where suppressing echo is more important than preserving double talk speech quality, and increased otherwise.

10. The acoustic echo mitigation method according to claim 9, further comprising:
calculating a changing rate of the norm of the coefficient set of the first adaptive filter, and
wherein a first number of past frames is decreased where the changing rate is less than a fourth threshold for a seventh number of consecutive observations; or increased where the changing rate is not less than a fourth threshold for an eighth number of consecutive observations.

11. The acoustic echo mitigation method according to claim 2, wherein,
an operation of obtaining the final estimate of the residual echo power is based on history of smoothed versions of reference signal power, a smoothed version of the error signal, and the noise power,
the minimum statistics is the minimum norm among the norms of the coefficient sets of the first adaptive filter for the first number of past frames, and
the operation of determining the coefficient set of the second adaptive filter is configured to adjust the coefficient set of the second adaptive filter where the minimum norm is less than a second threshold determined based on a norm of coefficient set of the second adaptive filter for a last frame.

12. The acoustic echo mitigation method according to claim 11, wherein the operation of determining the coefficient set of the second adaptive filter comprises adjusting the coefficient set of the second adaptive filter with a scaling factor determined as a ratio of the norm of the coefficient set of the first adaptive filter over the norm of the coefficient set of the second adaptive filter.

13. The acoustic echo mitigation method according to claim 11, wherein,
an operation of adaptively updating the coefficient set of the first adaptive filter is performed with respect to at least one frequency band each comprising a plurality of frequency bins,
the operation of obtaining the final estimate of the residual echo power is performed with respect to each frequency bin, and
the operation of determining the coefficient set of the second adaptive filter comprises:
determining a ratio of the norm of the coefficient set of the first adaptive filter with respect to each frequency band over the mean of the respective norms of respective coefficient sets of the second adaptive filter for respective frequency bins in the frequency band; and
adjusting the coefficient set of the second adaptive filter with respect to each frequency bin with the ratio as a scaling factor.

14. The acoustic echo mitigation method according to claim 2, wherein,
an operation of cancelling the estimated acoustic echo is performed based on an NLMS-based algorithm; and
the step size of the NLMS-based algorithm is updated based on the residual echo power and the power change of the error signal.

15. The acoustic echo mitigation method according to claim 14, wherein the step size of the NLMS-based algorithm is updated based on the residual echo power and an expectation of the power change of the error signal.

16. The acoustic echo mitigation method according to claim 4, further comprising:
estimating a significance of an echo path;
wherein an operation of cancelling the estimated acoustic echo or an operation of further suppressing the residual echo are not performed where the echo path is of low significance.

17. The acoustic echo mitigation method according to claim 16, wherein the minimum statistics is a minimum norm among the norms of the coefficient sets for the first number of past frames, and an operation of estimating the significance of the echo path further comprises:
finding, for each frequency bin and for the present frame, a long-term minimum norm among minimum norms for a fourth number of past frames;
calculating a sum of respective long-term minimum norms for respective frequency bins; and
wherein the operation of cancelling the estimated acoustic echo or the operation of further suppressing the residual echo are not performed where the sum is less than a third threshold for a fifth number of consecutive observations; or are performed where the sum is not less than a third threshold for a sixth number of consecutive observations.

18. The acoustic echo mitigation method according to claim 17, wherein the operation of estimating the significance of the echo path further comprises:
finding, for each frequency bin and for the present frame, a minimum norm among the norms for a fourth number of past frames;
calculating a sum of respective minimum norms for respective frequency bins; and
wherein the operation of cancelling the estimated acoustic echo or the operation of further suppressing the residual echo are not performed where the sum is less than a third threshold for a fifth number of consecutive observations; or are performed where the sum is not less than the third threshold for a sixth number of consecutive observations.

19. The acoustic echo mitigation method according to claim 2, wherein an operation of further suppressing the residual echo comprises applying to the error signal a gain determined based on the power change of the error signal, the residual echo power and the noise power.

20. An audio processing apparatus comprising an acoustic echo mitigation apparatus mitigation apparatus according to claim 1.

21. An voice communication terminal comprising an acoustic echo mitigation apparatus according to claim 1.

22. A non-transitory computer-readable medium with instructions stored thereon that when executed by one or more processors preform an acoustic echo mitigation method, comprising:
cancelling, with an acoustic echo canceller, estimated acoustic echo from a microphone signal, resulting in an error signal;
estimating residual echo power based on the error signal in a manner continuously adapted to power change in the error signal, wherein a residual echo estimation is obtained and a step size is updated based on the residual echo estimation; and
further suppressing, with an acoustic echo suppressor, residual echo and noise in the error signal based on the residual echo power and noise power, wherein the cancelling comprises updating a transfer function for estimating the acoustic echo based on the updated step size.

\* \* \* \* \*